US012646040B2

(12) United States Patent
McCabe et al.

(10) Patent No.: US 12,646,040 B2
(45) Date of Patent: Jun. 2, 2026

(54) ASSET-BACKED DIGITAL TOKENS

(71) Applicant: PRECIDIAN INVESTMENTS, LLC, Newtown Bucks, PA (US)

(72) Inventors: Daniel Joseph McCabe, Upper Saddle River, NJ (US); Paul Edward Kuhnle, Doylestown, PA (US); Mark Steven Criscitello, Colts Neck, NJ (US)

(73) Assignee: Precidian Investments, LLC, Newtown, PA (US)

( * ) Notice: Subject to any disclaimer, the term of this patent is extended or adjusted under 35 U.S.C. 154(b) by 0 days.

(21) Appl. No.: 18/579,292

(22) PCT Filed: Jun. 9, 2023

(86) PCT No.: PCT/US2023/024994
§ 371 (c)(1),
(2) Date: Jan. 12, 2024

(87) PCT Pub. No.: WO2023/239946
PCT Pub. Date: Dec. 14, 2023

(65) Prior Publication Data
US 2024/0265355 A1 Aug. 8, 2024

Related U.S. Application Data

(60) Provisional application No. 63/421,776, filed on Nov. 2, 2022, provisional application No. 63/350,784, filed
(Continued)

(51) Int. Cl.
| | |
|---|---|
| *G06Q 20/06* | (2012.01) |
| *G06N 20/00* | (2019.01) |
| *H04L 9/14* | (2006.01) |

(52) U.S. Cl.
CPC ........... *G06Q 20/065* (2013.01); *G06N 20/00* (2019.01); *H04L 9/14* (2013.01)

(58) Field of Classification Search
CPC .. G06Q 20/065; G06Q 2220/00; G06Q 20/02; G06Q 20/36; G06Q 20/06;
(Continued)

(56) References Cited

U.S. PATENT DOCUMENTS

| | | | | |
|---|---|---|---|---|
| 10,373,129 | B1 * | 8/2019 | James | ...................... H04L 9/06 |
| 11,783,417 | B1 * | 10/2023 | Winklevoss | ........... G06Q 40/04 |
| | | | | 705/37 |

(Continued)

FOREIGN PATENT DOCUMENTS

| | | | | |
|---|---|---|---|---|
| WO | WO-2020233092 A1 * | 11/2020 | ............. | G06F 9/547 |
| WO | WO-2021101948 A1 * | 5/2021 | ........... | G06Q 20/381 |

(Continued)

OTHER PUBLICATIONS

International Search Report and Written Opinion in related International Application No. PCT/US2023/024994, dated Oct. 3, 2023, 8 pages.

*Primary Examiner* — Chunling Ding
(74) *Attorney, Agent, or Firm* — Fish & Richardson P.C.

(57) ABSTRACT

Methods, systems, and apparatus, including computer programs encoded on computer-storage media, for, e.g., generating a private cryptographic key and public cryptographic key as a cryptographic key pair; storing the private cryptographic key and the public cryptographic key in a trusted execution environment (TEE); generating a smart contract configured to: identify a triggering event comprising a request to perform a service comprising generating digital currency; prior to performing the service, verify conditions for performing the service; and in response to verifying the conditions for performing the service, generating the digital currency; generating a hash value representing the smart contract using the private cryptographic key; transmitting the hash value representing the smart contract to a privacy computing platform; and transmitting the public crypto-
(Continued)

graphic key to the privacy computing platform configured to decrypt the hash value representing the smart contract.

19 Claims, 5 Drawing Sheets

Related U.S. Application Data on Jun. 9, 2022, provisional application No. 63/350,774, filed on Jun. 9, 2022.

(58) Field of Classification Search
CPC ........... G06Q 20/3827; G06Q 20/3829; G06Q 40/04; G06N 20/00; G06N 3/08; H04L 9/14; H04L 2209/56; H04L 9/3247; H04L 9/50; G06F 21/64; G06F 21/62; G06F 21/53
See application file for complete search history.

(56) References Cited

U.S. PATENT DOCUMENTS

| | | | | |
|---|---|---|---|---|
| 12,141,871 | B1 * | 11/2024 | James | ................. G06Q 20/065 |
| 2013/0046673 | A1 * | 2/2013 | Kiron | ..................... G06Q 40/04 |
| | | | | 705/37 |
| 2019/0197831 | A1 | 6/2019 | Batton | |
| 2019/0287175 | A1 * | 9/2019 | Hill | ........................ G06Q 20/22 |
| 2019/0318427 | A1 * | 10/2019 | Doney | ................ G06Q 20/065 |
| 2019/0333149 | A1 * | 10/2019 | Kim | ................... G06Q 20/3678 |
| 2020/0005290 | A1 | 1/2020 | Madisetti | |
| 2020/0342092 | A1 | 10/2020 | Wei et al. | |
| 2020/0387891 | A1 * | 12/2020 | Paschini | ............ G06Q 20/4016 |
| 2021/0090169 | A1 * | 3/2021 | Wang | .................... H04L 63/102 |
| 2021/0158168 | A1 | 5/2021 | Ahmad et al. | |
| 2021/0192496 | A1 | 6/2021 | Gregovic | |
| 2021/0192620 | A1 * | 6/2021 | Golomb | ............. G06Q 30/0204 |
| 2022/0360450 | A1 * | 11/2022 | Brandenburger | ..... H04L 9/0894 |
| 2023/0006976 | A1 * | 1/2023 | Jakobsson | .............. H04L 63/10 |
| 2023/0237472 | A1 * | 7/2023 | Weinstein | .......... G06Q 20/4016 |
| | | | | 705/69 |

FOREIGN PATENT DOCUMENTS

| | | | | |
|---|---|---|---|---|
| WO | WO-2022016102 | A1 * | 1/2022 | ............ G06N 3/043 |
| WO | WO-2022208330 | A1 * | 10/2022 | ........... G06Q 20/065 |

\* cited by examiner

Transfer Management System 204b

Broker Computing System 208b

Analytics Library 218b

Broker Database System 216b

Account Database 220b

Analytics Engine 214b

Brokerage Algorithm 222b

Validation System 212b

Database Transaction Agent 210b

Wallet 224b

UserDevice 202b

206b

200b

*300a*

| Identify a triggering event | *302a* |

| Verify conditions | *304a* |

| Generate a signal to control conversion based on condition verification | *306a* |

| Perform asset conversion | *308a* |

| Perform transaction using converted asset | *310a* |

| Display transaction results | *312a* |

*300b*

| |
|---|
| Identify a triggering event initiating a service request | *302b* |

↓

| |
|---|
| Process the service request | *304b* |

↓

| |
|---|
| Transmit the processed service request for validation | *306b* |

↓

| |
|---|
| Receive a validation result | *308b* |

↓

| |
|---|
| Receive an estimate of an intrinsic value of the asset | *310b* |

↓

| |
|---|
| Receive a confirmation of the value estimate | *312b* |

↓

| |
|---|
| Generate a trigger to complete service | *314b* |

↓

| |
|---|
| Display service outcome | *316b* |

ASSET-BACKED DIGITAL TOKENS

CROSS REFERENCE TO RELATED APPLICATIONS

This application claims priority to U.S. Provisional Application Nos. 63/350,774, 63/421,776, and 63/350,784. The contents of these priority applications are hereby incorporated by reference in their entirety.

TECHNICAL FIELD

The present disclosure relates to computer-implemented methods, software, and systems for an asset-backed digital token (e.g., digital currency or coins). Techniques include (i) providing and maintaining a digital token that can morph into different structures representing the same collective vehicle (e.g., a collective investment vehicle) to enable different attributes depending on the structure chosen, but reflecting a core underlying value equal to the other iterations and (ii) automatically calculating and disseminating an approximate amount for asset-backed digital token that matches an intrinsic value of underlying assets represented by the asset-backed digital token, which serves as a representation of a structure or wrapper corresponding to a same investment vehicle.

BACKGROUND

Digital tokens are frequently used in transactions or to facilitate other exchanges of content or information. Examples of such token can include digital coins or currencies (also referred to as cryptocurrencies or simply coins). Such digital coins or currencies typically have variable intrinsic value. Additionally, because digital coins or currencies may be fungible, e.g., throughout a 24-hour period when particular markets across the world are no longer active, calculation of accurate, up-to-date coin values can present multiple challenges.

SUMMARY

The present disclosure includes systems, software, and computer implemented methods for automatically calculating and disseminating an approximate value for an asset-backed coin that closely mirrors the intrinsic value of underlying assets represented by the asset-backed coin, which serves as a representation of a second iteration of the same investment vehicle. A first example system includes identifying a triggering event including a request to perform a service comprising backing a first asset using a second asset, transmitting the request for performing a verification of conditions for the service, receiving a validation result for the service, and receiving an estimate of a value of the first asset backed by the second asset.

The present disclosure further includes systems, software, and computer implemented methods for providing and maintaining a financial asset having the ability to morph into different structures representing the same collective investment vehicle, to enable different attributes depending on the structure chosen, but reflecting a core underlying value across the different structures. A first example system includes one or more computers and one or more computer memory devices interoperably coupled with the one or more computers and having tangible, non-transitory, machine-readable media storing one or more instructions that, when executed by the one or more computers, perform one or more operations. The operations include: identifying a triggering event including a request to convert an asset from a first type to a second type, performing a verification of conditions for a conversion of the first type to the second type, generating a signal to control the conversion of the first type to the second type based on the verification of the conditions, and performing the conversion of the first type to the second type based on the signal.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality.

Advantageous implementations can include one or more of the following technical advantage. For example, asset-backed digital currency can improve transaction efficiency in share transfer. Share transfers using traditional ETF or other funds can include multi-layered processing stages, which can further include manual oversight. The asset-backed digital currencies described in this document allow for reduced processing in exchanging one or more asset-backed digital coins between two or more entities.

The asset-backed digital currency described in this document can reduce size limitations on share orders (e.g., instead of being limited to fixed amounts of shares, entities can obtain one or more coins in the asset-backed digital currency which may represent a fractional amount of a share allowing more entity types to be able to obtain shares). In some implementations, entities obtain coins. For example, after initially obtaining coins of an asset-backed digital currency, entities can convert the one or more coins to the traditional ETF shares, which the coins represent. Each coin can represent a static or dynamic value which can be proportional to a value of an asset used as backing (e.g., an ETF) or underlying value in a second currency (e.g., U.S. dollars).

In addition, by converting digital assets from an ETF structure to an asset-backed coin, techniques described in this document enable a shareholder to move their ownership from a traditional brokerage account to a digital wallet. Techniques described can enable additional flexibilities and control over sharing, e.g., limiting the sharing of information with potential service providers. For example, by converting to an asset-backed coin, users can limit sharing information with, e.g., insurance companies, loan agents, brokerage companies, banks, mortgage entities, credit companies or other service providers. The techniques described can increase a user's control over assets and available options by accessing a broader array of potential service providers and removing imbedded legacy restrictions. In one use case, the owner of a wallet including asset-backed digital currency can directly control transfers or loans of coins and, e.g., a rate at which coins may be lent. In another use case, cross-border transfers between people or companies that would normally require foreign exchange transactions could be performed using diversified portfolios that meet both parties' requirements and settled by transfer of one or more asset backed coins.

One innovative aspect of the subject matter described in this specification is embodied in a method that includes generating a private cryptographic key and public cryptographic key as a cryptographic key pair; storing the private cryptographic key and the public cryptographic key in a trusted execution environment (TEE), generating a smart contract configured to: identify a triggering event comprising a request to perform a service comprising generating digital currency; prior to performing the service, verify conditions for performing the service; and in response to verifying the conditions for performing the service, generating the digital currency; generating a hash value representing the smart contract using the private cryptographic key; transmitting the hash value representing the smart contract to a privacy computing platform; and transmitting the public cryptographic key to the privacy computing platform configured to decrypt the hash value representing the smart contract.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include training a machine learning model to generate the triggering event for generating the digital currency. In some implementations, training the machine learning model to generate the triggering event for generating the digital currency includes: obtaining data representing user requests for generating the digital currency or other assets; and providing the data representing user requests for generating the digital currency or other assets to an input layer of a neural network; and in response to providing the data representing user requests for generating the digital currency or other assets to the input layer of the neural network, adjusting one or more weights or parameters.

In some implementations, the digital currency includes a virtual coin, a security, a mutual fund, exchange-traded product, or an exchange-traded fund. In some implementations, generating the digital currency includes: converting an asset from a first asset type to a second asset type. In some implementations, the first asset type is an exchange-traded fund (ETF) and the second asset type is a digital coin stored electronically in user wallets in a decentralized blockchain. In some implementations, the value of the digital coin is a percentage of a net asset value (NAV) of the ETF. In some implementations, actions include generating additional digital coins for each owner of an originally issued digital coin, wherein the value of each of the digital coins is less than the value when originally issued. In some implementations, the first asset type and the second asset type comprise one of a physical coin corresponding to a currency, a virtual coin, a security, a mutual fund, exchange-traded product, or an exchange-traded fund (ETF). In some implementations, actions include performing a transaction using the second asset type. In some implementations, actions include displaying a result of the transaction. In some implementations, actions include performing a verification of transaction conditions for performing the transaction using the second asset type.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
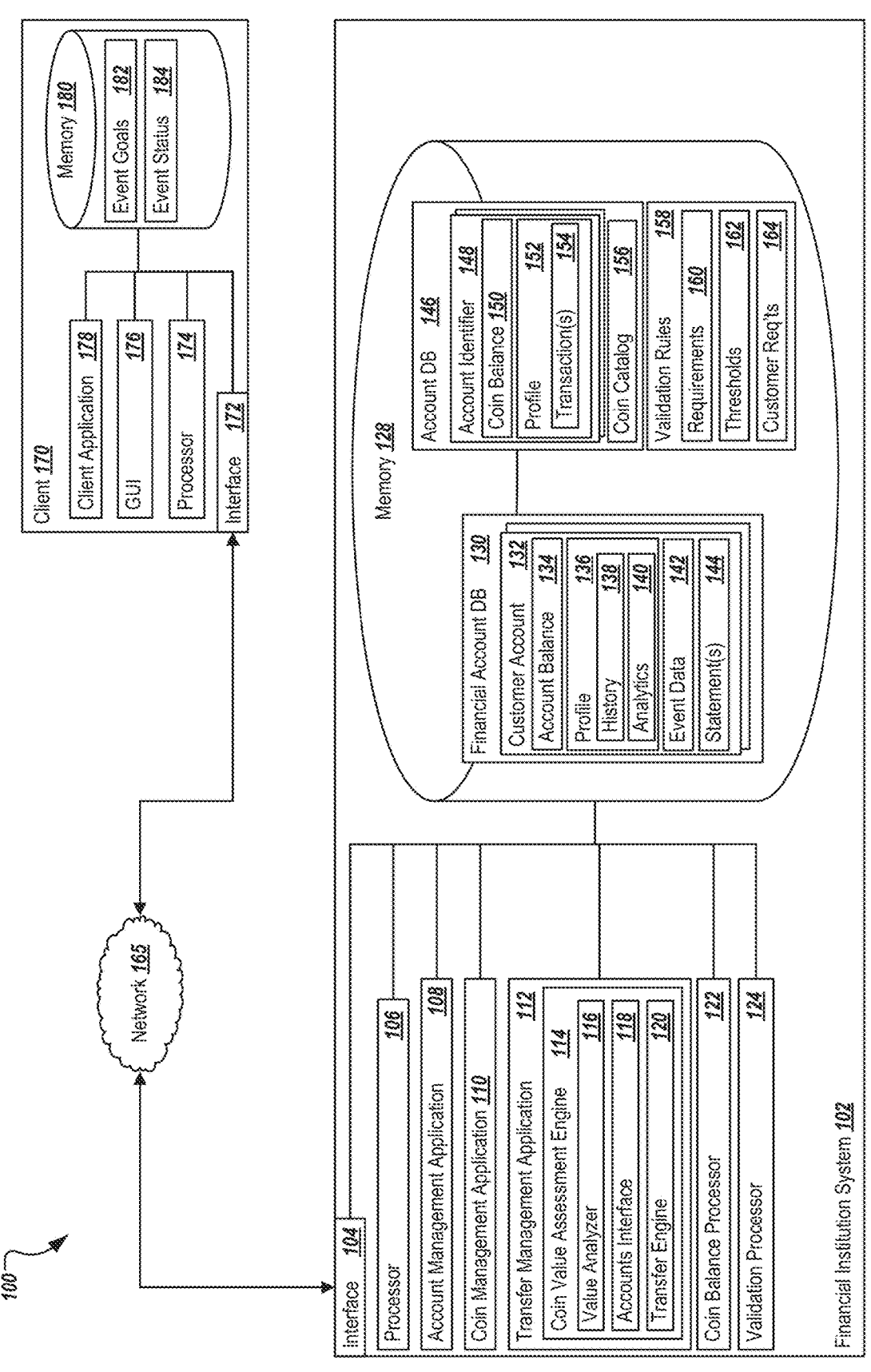
FIG. 1 is a block diagram illustrating an example system architecture in accordance with implementations of the present disclosure.

The present disclosure describes various tools and techniques for providing and maintaining a financial asset that can morph into different structures, or wrappers, representing the same collective investment vehicle to enable different attributes (e.g., exchange within a fully or partially decentralized network) depending on the structure or wrapper chosen. In particular, the techniques described herein can enable linking of different wrappers to allow them to represent a single investment fund. The structures can be linked to reflect a core underlying value that is the same across the different structures or wrappers. For example, one or more components of system 100 can issue a traditional investment product, such as a mutual fund or exchange-traded fund (ETF), and simultaneously issue one or more digital assets (e.g., virtual coins) available for exchange and peer-to-peer trading. The fund's portfolio can be represented equally in any of the simultaneously issued structures that are linked to each other (e.g., using one or more stored value ratios tying one structure to an amount of another structure). The linkage enables the ability to morph between different wrappers/structures to suit the needs of a user. Users or customers can include coin holders and investors. The users can be associated with one or more brokerage accounts that can be associated with a financial account, such as a trading account (alternatively, the users may not be associated with a brokerage account, but may come into possession of a digital asset or virtual coin in an unassociated wallet). The trading account can be configured to reflect, in real-time, financial asset conversion and peer-to-peer financial asset transfers and transition between wrappers that may occur on an on-demand basis or as a function of a triggering event.

In the present solution, an efficient method of morphing between structures that requires complex and real time management of the portfolio shares outstanding is described. Various types of collective investment vehicles (CIV) with shares in issuance (such as, e.g., exchange traded fund (ETF) shares in issuance, mutual fund shares in issuance), and various digital assets valued in relation to one or more assets—e.g., an asset backed coin or currency—in issuance can collectively represent the portfolio, balancing the accrual of expenses and dividends, distribution of spinoffs, wallet and holder verification and the depository trust and clearing corporation interface for brokerage clients. In some implementations, a fund manager's system would coordinate and reconcile the shares held at Depository Trust & Clearing Corporation (DTCC) with the shares that are on record with the transfer agent and any other repository of information that the manager's system coordinates with to track those with a claim on the fund's assets. If the fund manager's system determines to allow coins to be exchanged in wallets that are unlinked to brokerage accounts, the system could be configured to retain dividends within the fund and manage spinoffs internally or find another means of payment to the wallet outside of DTCC.

The techniques described herein automatically provide and maintain a financial asset configured to enable morphing into different structures representing the same collective investment vehicle to enable different attributes depending on the structure chosen, but reflecting a core underlying value across the different structures.

Any structural limitations as to transferability can be built into a smart contract. For example, a system, such as the system 100, can generate a smart contract configured with one or more rules to identify whether or not entities requesting a transfer of value stored in asset-backed currency can transfer that value. Limitations can include verifying that a receiving wallet is eligible prior to settlement. The smart contract could be configured to perform one or more of the following: (1) with respect to fund's assets, compare a data feed of the Custodian's Assets (held at DTCC or other Depository) with fund's shares and outstanding coins, and reconcile in real-time; (2) creation and redemption—i.e., reconcile coins outstanding with release and receipt of underlying assets held at the custodian; and (3) perform coin wallet reconciliation, which would encompass tracking and processing every coin transaction and log wallet holders in database.

The morphing process can be automatically set to run or execute at particular times, such as after the close of a billing cycle or a predetermined time period (eg., close of business or trading). The financial asset can morph into any of the different structures representing the same collective investment vehicle. The ability to morph into different structures can enable different attributes depending on the chosen structure, to reflect a core underlying value across the different structures. The morphing process can be achieved through an automatic conversion process at the fund level or through an automatic creation and redemption process whereby one iteration is exchangeable for a different iteration. As one example, a financial instrument could be an exchange traded fund (ETF) that is convertible into an asset backed coin through a conversion process whereby an ETF or multiple ETFs are exchanged with the fund for asset backed coins that have an equal representation of value but enable different fungibility given the limitations of each structure. The items are convertible in both directions (e.g., ETF to Coin and Coin to ETF) and each iteration or one iteration may be redeemable through a creation and redemption process with the fund for the underlying securities or the value of the underlying securities at a moment in time or across a spectrum of time (e.g., using a volume weighted average price). This conversion can be accomplished in several ways, eg., directly through the sponsor of the collective investment vehicle or through an agent thereof. Since the coins are convertible into ETF shares, they would have the same attributes as an ETF, e.g., in terms of the ability to create, redeem, trade, and/or loan these assets.

In some implementations, when a holder of ETF shares chooses to convert the ETF shares to digital coins, the holder can send a request to the ETF's transfer agent (e.g, one or more computers operating one or more algorithms that can include one or more machine learning algorithms), requesting conversion of the ETF share into the digital coin. The transfer agent can coordinate with one or more entities to perform a verification process to evaluate whether the identified ETF shares are eligible for such conversion (e.g., by evaluating a set of eligibility criteria relative to the ETF shares). For example, the transfer agent can communicate with the holder's Broker Dealer or another exchange regulator to perform the eligibility verification process. Example eligibility criteria include whether the ETF shares are fully paid, whether the ETF shares are unencumbered, have liens, loans, associated option positions, account documents, among others.

In some implementations, a transfer agent includes one or more generated smart contracts. For example, a smart contract—e.g., generated by one or more components of the system 100 can be executed in a distributed system to ensure that one or more entities satisfy one or more criteria for transferring value or converting value from one asset type to a digital currency or from a digital currency to another asset type. The smart contract can provide benefits over traditional systems by generating an immutable record that is recorded in a viewable blockchain ledger.

In terms of processing power, a smart contract can significantly reduce required processing power by reducing the number of computing elements required for either conversion of value or transfer. For example, in traditional system trading, one or more intermediaries can obtain and process data to ensure entities satisfy one or more criteria. In a specific case, traditional ETF sharing or conversions may require one or more transmissions from a first entity to an intermediary and to and from the intermediary to a second entity. Each transmission can require sufficient energy to power the computers that perform processing and generation for the transmissions, including algorithm executions. By generating a smart contract to ensure entities satisfy one or more limitations before converting or transferring value, processing can occur within a given entity's system such as a single computer. For example, a computer can download software configured to generate an instance of one or more smart contracts to be executed in response to a request from a user of the computer. The computer can perform one or more processing steps configured in the smart contract and then record a result in a viewable—e.g., publicly viewable-blockchain ledger. In this way, efficiency of individual actions—e.g., of conversion between asset structures or transfer of structures between entities-can be increased by reducing transmissions and processing to and from an intermediary.

In an example case, if ETF shares satisfy the transfer agent's established eligibility criteria, the transfer agent can confirm that the ETF shares are eligible for conversion. In the case of a smart contract, the transfer agent can automatically perform one or more subsequent actions in response to determining, using one or more instructions encoded in the smart contract, that one or more shares satisfy one or more criteria. The transfer agent can proceeds with the conversion of the ETF shares. If the transfer agent determines that the shares or one or more entities do not satisfy a criterion, the transfer agent can generate an transmit a notification to one or more devices indicating that the criteria were not met or specifically indicating which of one or more criterion have not been satisfied.

In some implementations, during a conversion process, the transfer agent suspends ETF shares that are subject of the conversion, e.g., the ETF shares are suspended by recording one or more values in a blockchain ledger indicating that specific identified shares subject to conversion are being converted or transferred. In some implementations, the transfer agent is a smart contract that is configured to automatically record identities of shares or other value types to suspend them from simultaneous or overlapping requests for transfer or conversion. For example, by recording specific entity identifiers or identifiers of specific values-such as assets, digital coins, among others-a system can ensure that value is not inadvertently converted or traded in a period between when a conversion or trade is requested and when the conversion or trade is completed.

In some implementations, the transfer agent can validate or verify with the Broker dealer to perform the suspension. Any applicable technique for suspension could be implemented by the Broker dealer, including, e.g., marking the applicable ETF shares as unavailable for trading, putting a hold that prevents any intervening access or trading of the ETF shares, applying a flag on the account, or any other specific security measure within the account.

Once the conversion process is complete, the suspension is released and the transfer agent determines that the ETF shares are no longer in the brokerage account and that the coins of equal value are credited by the transfer agent to the holder's known wallet. In some implementations, the transfer agent uses one or more instructions to execute processes that identify whether or not one or more conditions are satisfied. For example, a transfer agent can include a smart contract that is configured to determine that ETF shares are no longer in an associated account and that coins or other digital currency of equal value are credited by the transfer agent to the holder's known wallet. In some implementations, the smart contract is configured to record or otherwise notify that a conversion or transfer has been completed if and only if value of a first type is no longer in an associated account and that value of a second type of equal value are credited by the transfer agent to another wallet.

A similar process as described above can be utilized for facilitating the conversion of a holder's coins to ETF shares of equal value. In such implementations, when a holder of certain coins chooses to convert the coins to ETF shares, the holder can send a request to the Wallet Administrator (and/or transfer agent), requesting the conversion. The Wallet Administrator (and/or transfer agent) can perform a verification process to evaluate whether the identified coins are eligible for such conversion (e.g., by evaluating a set of eligibility criteria relative to the coins including executing one or more processes of a smart contract) and/or coordinate with one or more entities to perform this eligibility verification process.

Example eligibility criteria include whether the coins are fully paid for, whether the coins are unencumbered, have liens, loans, associated option positions, account documents, among others. If the coins meet the transfer agent's established eligibility criteria, the transfer agent confirms that the coins are eligible for conversion or transfer. In that case, Wallet Administrator coordinates with the transfer agent to perform the conversion of the coins at their current price. In some implementations, the Wallet Administrator includes a smart contract configured to convert value from one structure to another. For example, the Wallet Administrator can include a smart contract configured with one or more instructions that, when executed, delete or update one or more records stored on a digital medium. Deleting or updating of the one or more records can result in value being converted from one structure to another (e.g., from an ETF to digital currency or digital currency to ETF) or transferred from one entity to another.

During the conversion process, the Wallet Administrator and/or the transfer agent ensure that the coins to be converted are suspended, so that, e.g., the coins are not inadvertently traded in the period between when conversion is requested and when conversion is completed. In some implementations, the transfer agent performs the suspension by, e.g., marking the applicable coins as unavailable for trading, putting a hold that prevents any intervening access or trading of the coins, applying a flag on the wallet or any other specific security measure within the wallet. In some implementations, the transfer agent provides information to the Wallet Administrator to perform one or more operations including suspension of coins or other assets. Once the conversion process is complete, the suspension is released and the transfer agent coordinates with the Wallet Administrator to ensure that the coins are no longer in the wallet and that the ETF shares of equal value are credited by the transfer agent to the holder's Brokerage account.

The present disclosure describes various tools and techniques associated with automatically calculating and disseminating an approximate value for an asset-backed coin that mirrors the intrinsic value of underlying assets represented by the asset backed coin, which serves as a representation of a second structure/wrapper of the same investment vehicle. Users or customers (referred to herein as "users") can include coin holders and investors. The users can be associated with one or more brokerage accounts that can be associated with a financial account, such as a trading account (alternatively, the users may not be associated with a brokerage account, but may come into possession of a digital asset or virtual coin in an unassociated wallet). Through ongoing exchanges using those accounts, users can have an enhanced ability to trade peer-to-peer (e.g., on a blockchain network) and can establish a verified third party reference point for off-hours (e.g., percentage of NAV for an asset or collection of assets such as an ETF, as a value for each of the asset-backed coins, where the coins can be exchanged or traded anytime and not limited by trading being on or off-hours), which can be essential to building credibility and adoption. The peer-to-peer asset-backed coin transfers can happen in real time at an agreed upon price or time in the future (e.g., tomorrow's opening, next print, mid-market, end of day, volume weighted average price or another aggregation of prices average).

In the present solution, asset-backed coin transfers can be performed using a transfer system designed to include a third party reference system. The third party reference system can be configured to provide a value (price) for asset backed coins that can be used for exchanges. The asset-backed coins can be representations of complex portfolios (e.g., made up of multiple equity and/or non-equity assets), which can require advanced computing and interface applications to determine corresponding values.

A reference price can be calculated using a process approved by investors as adequately reflecting the value of a particular asset-backed coin at a moment in time. Since the coin will be fungible throughout a 24-hour period when certain markets are no longer active, the techniques described herein will utilize algorithms that enable better estimation of the intrinsic value of the coin (or other iteration) during those off hours. For example, one such algorithm may combine the real-time pricing with algorithms that estimate pricing for the closed markets in near real-time. As an example, if a portfolio has 50% w US listed companies and 50% European companies, value computation could use real-time prices for the currently open US market and a predictive algorithm for estimating prices for non-US companies for which the non-US markets are closed.

The process can be automatically set to nm or execute at particular times, such as after the close of a billing cycle or at a different, predetermined frequency. In some instances, the process execution can span multiple days, e.g., in the case where a price from a live market is obtained and a price from a currently closed market sometime after reopening which may be a different calendar day. The output of the third party valuation can be publicly accessible and can be disseminated online via a coin exchange or through the listed exchange securities information processor or through any digital interface that users (investors) can access. This disseminated price would also have a value to current ETFs in establishing valuations during closed market periods, which in turn would enable more efficient off-hours trading for ETFs.

Turning to the illustrated example implementation, FIG. 1 is a block diagram illustrating an example transfer management system 100 for automatically calculating and disseminating an approximate value for an asset-backed coin.

In general, the system 100 allows the illustrated components to share and communicate information across devices and systems (e.g., asset management system 102 and client 170, among others, via network 165). As described herein, the asset management system 102 may be a cloud-based component or system (partially or fully), while in other instances, non-cloud systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, asset management system 102 and client 170 may be any computer or processing device, e.g., a blade server, general-purpose personal computer (PC), Mac®, workstation, UNIX-based workstation, or any other suitable device. Moreover, although FIG. 1 illustrates a single asset management system 102, the system 102 can be implemented using a single system or more than those illustrated, as well as computers other than servers, including a server pool. In other words, the present disclosure contemplates computers other than general-purpose computers, as well as computers without conventional operating systems. Similarly, the client 170 may be any system that can request data and/or interact with the asset management system 102. The client 170, also referred to as client device 170, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others. The client 170 may include one or more specific applications executing on the client 170, or the client 170 may include one or more Web browsers or web applications that can interact with particular applications executing remotely from the client 170, such as the account management application 108, brokerage account management application 110, and the transfer management application 112, among others.

The asset management system 102 may be associated with the one or more applications or platforms, and may be associated with or a part of a cloud platform or system. As illustrated, the asset management system 102 includes or is associated with interface 104, processor(s) 106, the account management application 108, the brokerage account management application 110, transfer management application 112, a coin balance processor 122, a validation processor 124, and memory 128. While illustrated as provided by or included in the asset management system 102, parts of the illustrated contents may be separate or remote from the asset management system 102. For example, while illustrated as a single system, the account management application 108 may be managed at a first system and/or application infrastructure, while the brokerage account management application 110 may be managed at a second system and/or application infrastructure. Similarly, the transfer management application 112 may be managed at a third system and/or application infrastructure. In some instances, the underlying asset management may run the account management application 108 itself, while relying on one or more third parties to manage and provide functionality for brokerage accounts and transfer management, as well as other operations such as statement processing. In those instances, the various applications may be able to communicate and interact with each other through internal and/or external communications, including via one or more channels and protocols, including through one or more dedicated application programming interfaces (APIs) and/or interfaces through which information needed to execute is available. For purposes of the present illustration, these portions are illustrated together for ease of description.

Returning to the asset management system 102 illustrated in FIG. 1, the interface 104 is used by the asset management system 102 for communicating with other systems in a distributed environment—including within the environment 100—connected to the network 165, e.g., client 170, and other systems communicably coupled to the illustrated asset management system 102 and/or network 165 (e.g., blockchain network). Generally, the interface 104 comprises logic encoded in software and/or hardware in a suitable combination and operable to communicate with the network 165 and other components. More specifically, the interface 104 may comprise software supporting one or more communication protocols associated with communications such that the network 165 and/or interface's hardware is operable to communicate physical signals within and outside of the illustrated environment 100. Still further, the interface 104 may allow the asset management system 102 to communicate with the client 170 and/or other portions illustrated within the asset management system 102 to perform the operations described herein.

Network 165 facilitates wireless or wireline communications between the components of the environment 100 (e.g., between the asset management system 102, the client(s) 170, etc.), as well as with any other local or remote computers, such as additional mobile devices, clients, servers, or other devices communicably coupled to network 165, including those not illustrated in FIG. 1. In the illustrated environment, the network 165 is depicted as a single network, but may be comprised of more than one network without departing from the scope of this disclosure, so long as at least a portion of the network 165 may facilitate communications between senders and recipients. In some instances, one or more of the illustrated components (e.g., the transfer management application 112, the validation processor 124, etc.) may be included within or deployed to network 165 or a portion thereof as one or more cloud-based services or operations. The network 165 may be all or a portion of an enterprise or secured network, while in another instance, at least a portion of the network 165 may represent a connection to the Internet. In some instances, a portion of the network 165 may be a virtual private network (VPN). Further, all or a portion of the network 165 can comprise either a wireline or wireless link. Example wireless links may include 802a.11a/b/g/n/ac, 802a.20, WiMax, LTE, and/or any other appropriate wireless link. In other words, the network 165 encompasses any internal or external network, networks, subnetwork, or combination thereof operable to facilitate communications between various computing components inside and outside the illustrated environment 100. The network 165 may communicate, for example, Internet Protocol (IP) packets, Frame Relay frames, Asynchronous Transfer Mode (ATM) cells, voice, video, data, and other suitable information between network addresses. The network 165 may also include one or more local area networks (LANs), radio access networks (PANs), metropolitan area networks (MANs), wide area networks (WANs), all or a portion of the Internet, and/or any other communication system or systems at one or more locations.

The asset management system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the asset management system 102. Specifically, the processor 106 executes the algorithms and operations described in the illustrated figures, as well as the various software modules and functionality, including the functionality for sending communications to and receiving transmissions from clients 170, as well as to other devices and systems. Each processor 106 may have a single or multiple core, with each core available to host and execute an individual processing thread. Further, the number of, types of, and particular processors 106 used to execute the operations described herein may be dynamically determined based on a number of requests, interactions, and operations associated with the asset management system 102.

Regardless of the particular implementation, "software" includes computer readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The asset management system 102 can include, among other components, several applications, entities, programs, agents, or other software or similar components capable of performing the operations described herein. As illustrated, the asset management system 102 includes or is associated with the account management application 108, the brokerage account management application 110, the transfer management application 112, the coin balance processor 122, and the validation processor 124.

The account management application 108 may be any application, program, other component, or combination thereof that is associated with an asset management and used to manage and store user account-related information and metrics. The account management application 108 may access or receive information from one or more transactional systems, or may be a part of those transactional systems, where information relating to various user accounts is collected and information can be stored and/or referenced.

The account management application 108 may in some instances, be associated with or manage a financial account database 130 or set of information, where the financial account database 130 can store information associated with one or more customer accounts 132. Each customer account 132 may be associated with a particular customer and/or specific customer account. Where customers are associated with multiple accounts, each account 132 may be linked to other related accounts, or may be separate. Each account 132 may be related to a payment card, a financial account (e.g., a checking account), or both. Each customer account 132 may include an account balance 134, a profile 136, an event data 142 (if one exists), and one or more generated statements 144 for the account 132, although generated statements 144 may be stored separately in some instances. The account balance 134 can store information associated with a current coin value balance, asset value, or any other information identifying a current balance of the corresponding account 132. The customer profile 136 can include any suitable information associated with the associated customer. In some instances, demographic information may be stored in the account profile 136. As illustrated, an account history 138 may be included in the profile 136, and can be used to provide historical information related to account usage by the customer, such as historical transactions, successfully completed transactions, failed transactions or invalid transaction information, as well as timeliness information related to transaction associated with the account 132 and/or other associated accounts 132. Further, a set of customer analytics 140 may also be included in or derived from the account 132 and historical information therein. For example, the analytics 140 may identify an average coin value amount on the account 132. Other analytics may be used by the transfer management application 112 when determining whether particular transfers are to be validated and completed as described herein. The analytics 140 can be updated, for example, by the coin balance processor 122 described below. The event data 142 can be updated, for example, by the validation processor 124 and can be used to generate a modified statement 144. The event data 142 may be a field generated from one or more user-definable custom fields updated by the account management application 108 in the financial account database 130. In other instances, the event data 142 may be managed apart from, but linked to, the particular customer account 132. The event data 142 may occur after a deposition of asset-based coins, after a transaction request is generated, and after a transaction is approved, and after a transaction is successfully completed or blocked.

The brokerage account management application 110 can be a part of or associated with a transfer management system or application, and is used to manage information related to and operation of an asset-based coin transfer program updated by the asset management. The brokerage account management application 110 can be used to allow customers to accumulate asset-based coins based on transactions and account related actions in an effort to provide benefits to customers, retain existing customers, and attract new customers. The brokerage account management application 110 may be operated or executed by the asset management in the asset management system 102 as illustrated, while in other instances, third parties or other entities, subsidiaries, or companies may manage transfer or event accounts for the asset management. As illustrated, the brokerage account management application 110 can be associated with a brokerage account database 146, at which information associated with particular brokerage accounts can be stored and managed. The brokerage account database 146 may be a part of the financial account database 130, or it may be separate therefrom. Information related to the brokerage account management application 110 can be stored in any suitable location, but is illustrated as stored in the brokerage account database 146.

As illustrated, the brokerage account database 146 can store a plurality of brokerage accounts, each associated with an account identifier 148. The account identifier 148 can correspond directly to an identifier of a corresponding customer account 132 from the financial account database 130, or may be associated with a unique identifier for the corresponding brokerage account, which may be mapped to or otherwise related to or associated with a particular customer account 132 or accounts. Each account may be associated with a transfer coin balance 150, where the transfer coin balance 150 identifies a current amount of transfer coins available to the brokerage account and corresponding customer. Additionally, the brokerage account database 146 may associate a profile 152 with each particular account identifier 148. The profile 152 may include information about or related to the particular customer associated with the brokerage account. The profile 152 may include brokerage account-related preferences, among others. Further, the profile 152 may identify one or more transactions 154 for the transfer customer. In some instances, transactions 154 may be manually or explicitly selected by the customer as particular goals for which transfer coins may be redeemed in the future. In other instances, the transfer management application 110 may, based on information in the profile 152 (e.g., demographic information and transfer coin redemptions of similar users, information on prior redemptions and transfer events of the particular customer, etc.) and/or based on the profile 136 of the customer account 132 (e.g., prior purchases and transactions, etc.) may implicitly or dynamically identify one or more particular transactions 154 for the customer associated with the account identifier 148 without the customer's explicit selection of the particular event goal 154. Any suitable analysis system may be used. The brokerage account database 146 can further include a coin catalog 156 identifying one or more coins and their corresponding coin value. The one or more coins in the coin catalog can be for specific asset type used for backing the coins or services related to asset backed coins, associated with one or more providers, or access to provider-specific asset backed coins, including some that may not be updated to the general public or non-customers of the asset management. In some instances, the brokerage account management application 110 may allow the customer to view, via a client application 178 and/or a web browser, the coin catalog 156, and to perform redemptions of particular coins using one or more compensation methods. The brokerage account management application 110, or any other suitable application, can allow the customer to select or identify particular transactions to be added as a request for transaction(s) 154 to be used in a later analysis and potential transaction. Additionally, based on browsing history, one or more items in the coin catalog 156 may be identified as potential transaction goals 154.

The transfer management application 112 can be associated with a tool used by the asset management to identify and generate potential transactions to customers based on any suitable combination of factors. The transfer management application 112 may be associated with a separate transfer management system, and may be associated with additional transactions related to the asset management, including transactions for asset backed coin transactions.

The coin value analyzer 116 can perform operations associated with identifying one or more transactions 154 identified by or for the customer. The coin value analyzer 116 can access the brokerage account database 146 using an accounts interface 118, which can perform operations and authorizations required to access a brokerage account associated with a particular account identifier 148 and corresponding to a particular customer account 132. The identified transactions 154 can be identified from the brokerage account profile 152, along with any coin values associated with those transaction events. The accounts interface 118 can also access the associated customer account 132 to identify any relevant customer information, including a customer profile 136, to identify information related to whether the transactions are valid. A transfer engine 120 of the coin value assessment engine 114 can perform an analysis to determine whether a particular transaction is to be provided, and further, can perform operations associated with the transaction if validated. As used herein, the term "engine" refers to a set of computing/programmatic instructions, that when executed by a data processing apparatus (e.g., a processor), result in the performance of certain operations associated with the underlying component (e.g., the hashing engine).

In particular, the transfer engine 120 may access or execute a set of validation rules 158 stored in memory 128. The validation rules 158 can define information identifying particular situations and rules where such asset backed coin transactions are valid and allowed. The validation rules 158 can be based on any suitable criteria, and may be fully customized on a customer-by-customer basis, as well as based on customer classifications (e.g., account types, demographic information, customer tier level, customer spending history, customer historical transactions, etc.). The validation rules 158 may include one or more transaction requirements 160, which may determine whether a current context or requirement for a transaction is valid. Additionally, a set of transaction thresholds 162 may be defined to determine when such a transaction may be made. In some examples, an absolute coin value may be defined as a highest amount of coin value in any particular valid transaction. For example, a particular rule may define a maximum amount of coin value to be transferred in a single transaction or within a set time periods. That threshold 162 may dynamically increase or decrease based on any number of factors, including a customer's account limit, expected deposit of asset-backed coins over a particular period of time, or any other analytics 140 or information about the customer. Similarly, the thresholds 162 may include a relative amount of asset-backed coins to be allowed to be transferred for any particular transaction 154. For example, the threshold may be limited to 10% of the total coin value per transaction. Similarly, a set of customer requirements 164 may be defined to ensure that only customers who meet particular customer criteria can perform valid transactions. In some instances, the customer requirements 164 may identify a particular minimum account age or any other suitable requirement. Any suitable rule may be defined that allows the asset management to identify customers with a type of creditworthiness as it relates to the coin transaction to ensure that such customers can continue to use the customer account 132. In some instances, the transaction consideration and analysis can be performed periodically at particular intervals. In some instances, the frequency of the analysis may increase based on the likelihood a particular customer may transfer coins, or based on a relative ranking of customers.

A coin balance processor 122 can perform operations associated with a transfer of coin balances 150 when coin values are determined. In response to the transactions performed and/or the actions taken by the customer, the coin balance processor 122 can identify coin values to be automatically adjusted, and can credit the corresponding transfer coin balance 150 of that customer. Similarly, when a coin is redeemed, whether in response to a particular transaction or based on a customer selection and redemption without a transaction, the coin balance processer 122 can debit the coin balance 150 accordingly. In instances where the transaction is validated, such that the coin value used for a transaction was set to be determined at a future time, the transfer coin balance 150, the coin balance processor 122 can update an event data field 142 in the financial account database 130 to trigger an automatic update at the set future time. In doing so, the coin balance processor 122 ensures that the coin value is accurately reflected within the customer account 132, and can be considered after future allocations of new values are performed after the next period or cycle is complete. The event data 142 can be considered during those future allocations, and any coins earned during the period can be automatically adjusted based on preset ruled when applied to the transfer coin balance 150.

The coin balance processor 122 can perform the coin transactions using a batch process executed at a set time (e.g., end of a billing or account cycle). A batch file or process can be used to evaluate the event data 142 for each customer account 132 among a plurality of customer accounts 132.

The validation processor 124 can perform operations to generate one or more statements 144 for customers. In particular, the statements 144 include information on an account balance 134 of the customer from a customer account 132 and a transfer coin balance 150 from a brokerage account having an account identifier 148 that is linked or corresponds to the customer account 132. In instances where a transfer is requested additional operations can occur. First, the validation processor 124 is updated or instructed, when initially accessing the customer account 132, to determine whether an event data indicates the transaction as being valid. In some instances, the analysis may determine whether an event data field 142 is created and includes a value other than 0. If so, an event data may exist, and should be included by the validation processor 124 in the currently generated statement 144. In doing so, the validation processor 124 can identify the transaction data associated with the requested transaction, insert that information into the generated statement 144, and provide the updated statement 144 to one or more validation engines, where the statement 144 includes information related to the transaction and the customer account 132, and any event data 142 identified for the customer account 132. The validation processor 124 may be software or a process associated with a third-party vendor apart from the asset management system 102, where the validation processor 124 can access the relevant customer accounts 132 in the financial account database 130 and the transfer coin balances 150 in the brokerage account database 146.

Memory 128 of the asset management system 102 may represent a single memory or multiple memories. The memory 128 may include any memory or database module and may take the form of volatile or non-volatile memory including, without limitation, magnetic media, optical media, random access memory (RAM), read-only memory (ROM), removable media, or any other suitable local or remote memory component. The memory 128 may store various objects or data, including financial data, user and/or account information, administrative settings, password information, caches, applications, backup data, repositories storing business and/or dynamic information, and any other appropriate information associated with the asset management system 102, including any parameters, variables, algorithms, instructions, rules, constraints, or references thereto. Additionally, the memory 128 may store any other appropriate data, such as VPN applications, firmware logs and policies, firewall policies, a security or access log, print or other reporting files, as well as others. While illustrated within the asset management system 102, memory 128 or any portion thereof, including some or all of the particular illustrated components, may be located remote from the asset management system 102 in some instances, including as a cloud application or repository, or as a separate cloud application or repository when the asset management system 102 itself is a cloud-based system. In some instances, some or all of memory 128 may be located in, associated with, or available through one or more other financial systems of the associated asset management. In those examples, the data stored in memory 128 may be accessible, for example, via one of the described applications or systems. As illustrated and previously described, memory 128 includes the financial account database 130, the brokerage account database 146, and the validation rules 1'58, among others.

As illustrated, one or more clients 170 may be present in the example system 100. Each client 170 may be associated with one or more customer accounts 132, either as a client device at which the customer of the customer account 132 is linked, or as a client device through which the particular customer accesses financial information and can interact with one or more transactions for asset backed coins. As illustrated, the client 170 may include an interface 172 for communication (similar to or different from interface 104), at least one processor 174 (similar to or different from processor 106), a graphical user interface (GUI) 176, a client application 178, and a memory 180 (similar to or different from memory 128).

The illustrated client 170 is intended to encompass any computing device such as a desktop computer, laptop/notebook computer, mobile device, smartphone, personal data assistant (PDA), tablet computing device, one or more processors within these devices, or any other suitable processing device. In general, the client 170 and its components may be adapted to execute any operating system, including Linux, UNIX, Windows, Mac OS®, Java™ Android™, or iOS. In some instances, the client 170 may comprise a computer that includes an input device, such as a keypad, touch screen, or other device(s) that can interact with one or more client applications, such as one or more dedicated mobile applications, including a mobile wallet or other banking application, and an output device that conveys information associated with the operation of the applications and their application windows to the user of the client 170. Such information may include digital data, visual information, or a. GUI 176, as shown with respect to the client 170. Specifically, the client 170 may be any computing device operable to communicate with the asset management system 102, other clients 170, and/or other components via network 165, as well as with the network 165 itself, using a wireline or wireless connection. In general, client 170 comprises an electronic computer device operable to receive, transmit, process, and store any appropriate data associated with the environment 100 of FIG. 1.

The client application 178 executing on the client 170 may include any suitable application, program, mobile app, or other component. Client application 178 can interact with the asset management applications (e.g., account management application 108, brokerage account management application 110, and transfer management application 112) and the asset management system 102 via network 165. In some instances, the client application 178 may be a web browser, where the functionality of the client application 178 may be realized using a web application or website the user can interact with via the client application 178. In other instances, the client application 178 may be a remote agent, component, or client-side version of the asset management system 102 and/or any of its individual components. In some instances, the client application 178 may interact directly with the asset management system 102 or portions thereof.

GUI 176 of the client 170 interfaces with at least a portion of the environment 100 for any suitable purpose, including generating a visual representation of any particular client application 178, and/or the content associated with any components of the asset management system 102. GUI 176 may also be used to view and interact with various web pages, applications, and web services located local or external to the client 170. Generally, the GUI 176 provides the user with an efficient and user-friendly presentation of data provided by or communicated within the system. The GUI 176 may comprise a plurality of customizable frames or views having interactive fields, pull-down lists, and buttons operated by the user. In general, the GUI 176 is often configurable, supports a combination of tables and graphs (bar, line, pie, status dials, etc.), and is able to build real-time portals, application windows, and presentations. Therefore, the GUI 176 contemplates any suitable graphical user interface, such as a combination of a generic web browser, a web-enable application, intelligent engine, and command line interface (CLI) that processes information in the platform and efficiently presents the results to the user visually.

In some instances, portions of the interactions and asset management system's 102 data may be stored remotely within memory 180. As illustrated, memory 180 may store information related to a current set of events goals 182 identified by the customer associated with client 170, as well as a current event status 184 of the customer. In some instances, additional information from either the financial account database 130 and/or the brokerage account database 146 associated with the corresponding customer account 132 and brokerage account of the customer may be stored locally at memory 180 for use by the client application 178. In some instances, the client application 178 may be associated with a mobile wallet, and can be used to store a set of mobile wallet data, including information related to one or more cards and/or accounts, including in some instances, any associated brokerage account information.

While portions of the elements illustrated in FIG. 1 are shown as individual components that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2A:
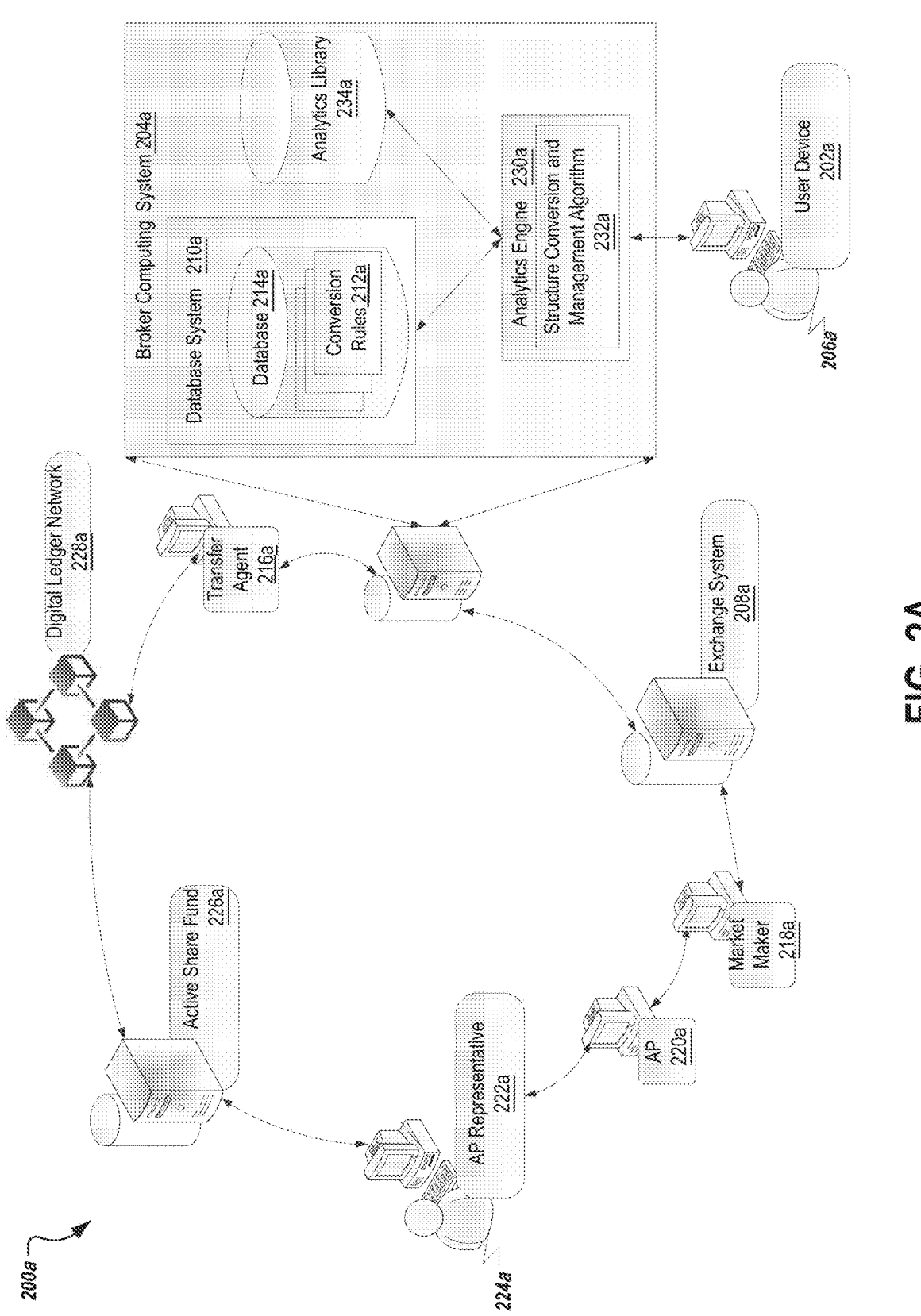
FIG. 2A represents a first example of a process flow diagram in accordance with implementations of the present disclosure.

FIG. 2A represents diagram illustrating an example process flow for providing, updating, and converting a financial asset for enabling transfers by using a selected structure of the financial asset. As illustrated in FIG. 2A, a user device 202a can access a broker computing system 204a for real time management of the portfolio shares. For example, the user device 202a can receive an input from a user 206a (e.g., investor) including a request to trade a financial asset using a first structure (e.g., asset backed coins), where the financial asset is stored using a second structure (e.g., ETF) having the ability to morph into different structures, including the second structure.

The user input can be automatically processed by the user device 202a to ensure user data security. For example, the user device 202a can encrypt a filtered version of the user input to generate a safe transfer request that can prevent malicious data parties from accessing private user data. In some implementations, the user input is encrypted using a private key of a public-private key pair generated by the broker computing system 204a. In some implementations, tokens or portions of tokens may be used as a stand in for a user account number, user name, pin number, routing information related to the asset management associated with the account, security code, or other like information relating to the user account. The one or more tokens may then be utilized as a payment instrument to complete a conversion of the financial asset and the transaction. The one or more tokens may be associated with one or more payment devices directly or within one or more digital wallets 224b associated with the payment devices. In some implementation, the tokens may be associated with electronic transactions that are made over the Internet instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

The user device 202a can transmit the transfer request directly to the broker computing system 204a to be processed. The broker computing system 204a can be configured to send the transfer requests to the exchange system 208a to be converted from a first structure to a second structure of an equivalent value before processing the transfer requests.

The exchange system 208a can process the transfer requests using one or more individual conversion rules 212a stored in a rule database 214a of a database system 210a and account information (e.g., account history, account limits, coin types, etc.) retrieved from the broker computing system 204a. An individual data rule (such as an association rule) can include one or more conditions (antecedents) to define when the rule applies and one or more consequences that define outcomes expected to follow if the conditions are met. A rule can be considered to be in scope if the antecedents for the rule are satisfied. A rule can be considered to be satisfied, or valid, if the rule is in scope and all expected consequences of the rule are satisfied. A rule can be used to set values or the rule can be used to determine whether particular data is valid (e.g., satisfies the rule). In some implementations, all or a portion of the individual data rules can be manually entered by a transferred agent 216a or another user, including variants of rules initially identified by the exchange system 208a. For example, individual data rules can be imported from another repository or provided by another process. In some implementations, individual data rules can be associated with result statistics that can provide information about the accuracy of an individual data rule, which can be applied to particular transaction types.

The exchange system 208a can generate a conversion result for each processed transfer request. The conversion result can include a corresponding value of the converted financial asset and a transfer request identifier indicating whether the requested transfer is valid. For example, the exchange system 208a can generate a statement, and can transmit the statement including information detailing request validity, account legitimacy, current value balance for the selected structure, current event data, and current transfer balance corresponding to the selected structure. In response to determining that the transfer is not valid, the exchange system 208a can transmit a signal to one or both of the user device 202a and the broker computing system 204a to terminate communication and block the requested transfer. In response to determining that the transfer is valid, the exchange system 208a can transmit a signal to one or both of the market maker 218a and the broker computing system 204a to further process the validated transaction request. The market maker 218a can complete transactions by selling shares of financial assets of particular structures (e.g., ETF) from its own inventory. The market maker 218a can include a broker dealer firm that accepts the risk of holding a certain number of shares of the financial assets of particular structures in order to facilitate trading in that security. The marker makers 218a can compete for investor order flow by displaying buy and sell quotations for a guaranteed number of shares. In some implementations, the market maker 218a can sell shares of the financial assets of particular structures from its own inventory or seek an offsetting order. One skilled in the art will appreciate that the market maker 218a can transmit market maker pricing data to the exchange system 208a. The market maker 218a can calculate its own buy and sell quotations for financial assets of particular structures, which includes its own margins and are therefore not necessarily reflective of the values of the constituents of the trust. In some implementations, the purchase of the share(s) may be performed multiple times throughout the day, and may settle the same day and/or multiple times a day. In some implementations, settlement may occur at fixed times throughout the day (e.g., at set intervals) or at a fixed interval following the trade (e.g. T+3). The market maker 218a can communicate with Authorized Participants (AP) 220a to issue financial assets of particular structures.

For example, the trust shares may be issued to designated broker dealers AP 220a only, in creation units consisting of a specified number of shares. To create new financial assets (e.g. ETFs or coins), the AP may deliver the required number of constituent shares plus a cash value to the AP representative 222a, which can transmit corresponding financial assets (e.g., ETFs and securities) to the active share fund 226a that holds securities. In some implementations, the APR is not required and the AP can directly deliver to the fund and can, in general, interface directly with the fund for purposes of creation and redemption. The AP 220a can also redeem units and receive back a proportionate number of constituent shares, plus or minus any applicable cash value. The amount of securities and cash to be delivered or received may be calculated by AP 220a. The exchange-traded fund of financial assets (e.g., shares) can be listed by the exchange system 208a and can be traded in a secondary market as individual shares in the same manner as other equity securities.

The broker computing system 204a can be configured to process the transfer requests for financial assets of particular structures. The broker computing system 204a can include an analytics engine 230a, a broker database system 210a, and an analytics library 234a. The broker database system 210a includes an account database 214a configured to store account data for multiple users. The account data can be formatted as tables that can include multiple rows (or records) and multiple columns (or attributes or fields). In some implementations, based on analyzing records for one or more of the tables, associations can be determined between values for particular attributes in one or more tables that enable automatic validation of account activities to ensure account security and to prevent malicious activities related to the user accounts stored in the account database 214a. The account data can be processed by the analytics engine 230a, by executing a structure conversion and management algorithm 232a.

The structure conversion and management algorithm 232a can be executed by the broker computing system, to retrieve a portion of the data stored in at least a portion of the tables in the account database 214a and to process the retrieved data in view of a received transfer request. The analytics library 234a can collect the analytics data used by the structure conversion and management algorithm 232a as input for optimizing subsequent analytics (e.g., by using a machine learning algorithm). The structure conversion and management algorithm 232a can calculate an equivalent value for a financial asset of a first structure (e.g., an asset-backed coin) that matches the value of the underlying assets represented by a second structure (e.g., ETF). The structure conversion and management algorithm 232a can trigger a conversion process at the fund level, through an agent of the fund or through a creation and redemption process whereby one structure is exchangeable for a different structure. The financial asset of a selected structure can be an exchange-traded product that is convertible into an asset-backed coin through a conversion process whereby an ETF or multiple ATFs are exchanged with the fund for asset-backed coins that have an equal representation of value but enable different fungibility given the limitations of each structure.

The financial assets are convertible in both directions (i.e., from one structure type to another (e.g., ETF to Coin and Coin to ETF)). Moreover, each structure may be redeemable through a creation and redemption process executed by the active share fund 226a for the underlying securities or the value of the underlying securities at a moment in time or across a spectrum of time (e.g., volume weighted average price). The conversion process from one structure type to another can be accomplished in several manners. In some implementations, the conversion process from one structure type to another can be accomplished directly through the sponsor of the collective investment vehicle or through a transfer agent 216a. The interaction with the sponsor may come in the form of an order type on the exchange system 208a or through direction to the transfer agent 216a or active share fund 226a (e.g., convert to type or symbol) or through a creation and redemption methodology similar to today's ETF's. For example, the coins are convertible into ETF shares that have the same create-ability, redeem-ability, tradability and loan-ability as any ETF. The process of creation and redemption could mirror the active shares structure that uses an AP representative 222a as an intermediary between the fund and the redeemer or could employ an AP 220*a* without an AP representative 222*a* between the AP 220*a* and active share fund 226*a*. Orders for conversion, creation or redemption can be limited to certain sizes (value or shares) or within certain time parameters to mirror ETF access. ETFs can be redeemable upon demand or upon a triggering event. The triggering event can include, e.g., reaching a time threshold (e.g., 4:00 pm), a price threshold (at $100a), a relative movement (if x<y), a date threshold (1/1/203*a*1) or some other predefined threshold. Each structure type (e.g., both ETF and digital coin) can have associated trigger events. The coins can be held and be marked as pending settlement for the triggering settlement event. Triggering settling events can be multifaceted and the asset can be quarantined until settlement.

In some implementations, a user device 224*a* can access the blockchain network 228*a* to initiate a financial asset creation request to the blockchain to invoke a contract object to create the financial asset of a selected structure type convertible to another structure type, and then add address information of the created financial asset to a target object that holds the financial asset. For example, an execution program used to create the financial asset can be pre-declared in the contract object. In this case, an asset object can be created by invoking the execution program.

In some implementations, the user device 224*a* can access the blockchain network 228*a* to initiate a financial asset conversion request to the blockchain when requesting to convert the financial asset of a first structure type to a second structure type. After receiving the financial asset conversion request, a node device in the blockchain can respond to the financial asset conversion request. The node device can invoke the contract object published on the blockchain and corresponding to the second asset type, to convert the financial asset of the first asset type into the financial asset of the second asset type and then add the financial asset of the second asset type obtained after conversion to the target object that holds the asset object of the first asset type. In this manner, the asset type conversion of the asset object is completed.

According to the previously described implementation, a user device 224*a* can initiate a financial asset conversion request, and declare the financial asset of the first asset type to be converted and the second financial asset type to be obtained after conversion in the financial asset conversion request. The node device can invoke the contract object published on the blockchain and corresponding to the second financial asset type, to convert the financial asset object of the first asset type into the financial asset of the second asset type and then add the financial asset of the second asset type obtained after conversion to the target object that holds the financial asset of the first asset type. As such, conversion of the financial assets can be completed online within the blockchain network 228*a*. The blockchain network 228*a* described in the present specification can include any type of blockchain network that can convert structures of financial assets. In some implementations, one or more nodes of the blockchain network 228*a* are communicably connected to the active share fund 226*a* to enable creation and redemption of financial assets of different structures. The blockchain network 228*a* can provide a decentralized (or weakly centralized), non-tampering (or difficult to tamper with), trusted distributed ledger, and can provide a secure, stable, transparent, auditable, and efficient method of recording transactions and data information interaction. The blockchain network 228*a* can include a plurality of nodes.

Generally, one or more nodes of the blockchain belong to one participant. Generally, the more participants in a blockchain network, the more authoritative the participants are, the more trustworthy the blockchain network 228*a* is. Here, a blockchain network formed by a plurality of participants is referred to as a blockchain platform. The blockchain platform can help the first institution to verify the identity. In order to use the distributed digital identity service provided by the blockchain platform, the first institution can register its identity in the blockchain platform. For example, the first institution can create a pair of public and private keys, secretly store the private key, and can create a distributed digital identity (also referred to as a decentralized identifier, DID). The first institution can create the DID by itself, or can request a decentralized identity service (DIS) system to create the DID. The DIS is a blockchain-based identity management solution that provides functions such as creating, verifying, and managing digital identities, so as to manage and protect entity data under regulation, ensure authenticity and efficiency of information flow, and solve problems such as cross institution identity authentication and data cooperation. The DIS system can be connected to the blockchain platform, A DID can be created for the first institution by using the DIS system, the DID and the public key are sent to the blockchain platform for storage, and the created DID is further returned to the first institution. The public key can be included in DIDdoc, which can be stored in the blockchain platform. The DIS can create the DID for the first institution based on the public key sent by the first institution, for example, the DID is created after the public key of the first institution is calculated by using the hash function; or DID can be created based on other information of the first institution (which can include the public key or not include the public key). The latter case may need the first institution to provide information other than the public key. Afterward, the first institution can provide a verification function to prove to other parties that it is the first institution.

In some implementations, one or more nodes of the blockchain network 228*a* can determine risk scores of asset transfers and transactions across multiple different nodes of the digital ledger network 228*a* (which in some implementations can be a blockchain network), based on both transaction data for the transaction and system state data for the hosts involved in handling the transaction. The risk scores are examined to identify those transactions that are deemed high risk, with above-threshold scores. Such transactions can be blocked or queued for further examination in a case management system, for example. The digital ledger network 228*a* can use transaction data for comparison with historical transaction data, and risk score(s), can be stored on the digital ledger network 228*a* to provide immutable, secure, and distributed data storage. Use of the digital ledger facilitates the collection and analysis of a large amount of transaction data and system state data, which may grow over time as transaction traffic increases and/or transaction networks expand by adding more hosts to accommodate the increased traffic. Accordingly, through the use of a digital ledger network to store and analyze the data, implementations provide scalability with respect to the data extraction, analysis, and storage of the data. Moreover, because the digital ledger network is distributed across multiple network locations, implementations avoid the use of a centralized database for data storage and are therefore less vulnerable to corruption or deletion by malicious processes, in comparison to traditional, previously available risk analysis solutions that are vulnerable to attack at such a centralized storage hub.

Figure 2B:
FIG. 2B represents a second example of a process flow diagram in accordance with implementations of the present disclosure.

FIG. 2B represents diagram illustrating an example process flow for calculating and disseminating an approximate value (verified intraday indicative value or VIIV) for an asset-backed coin (ABC) and providing peer-to-peer transfers of the coins. As illustrated in FIG. 2B, a user device 202b can access a transfer management system 204b (e.g., example transfer management system 100 described with reference to FIG. 1) to request a transaction for asset backed coins. The transfer management system 204b can include a broker computing system 208b, a database transaction agent 210b, and a validation system 212b.

For example, the user device 202b can receive an input from a user 206b (e.g., investor) including a request to trade asset backed coins stored in a digital wallet 224b. The user input can be automatically processed by the user device 202b to ensure user data security. For example, the user device 202b can encrypt a filtered version of the user input to generate a safe transfer request that can prevent malicious data parties from accessing private user data. In some implementations, the user input is encrypted using a private key of a public-private key pair generated by the transfer management system 204b. In some implementations, tokens or portions of tokens may be used as a stand in for a user account number, user name, pin number, routing information related to the asset management associated with the account, security code, or other like information relating to the user account.

The user device 202b can transmit the transfer request directly to the broker computing system 208b to be processed. In some implementations, the user device 202b transmits the transfer request to the database transaction agent 210b, which can be configured to transmit the transfer request directly to the broker computing system 208b. In some implementations, the database transaction agent 210b can be configured to execute private transaction logs before transmitting the transfer request to the validation system 212b or the broker computing system 208b. The broker computing system 208b can be configured to send the transfer requests to the validation system 212b to be validated before processing the transfer requests.

The validation system 212b can validate the transfer requests using one or more individual transfer rules stored in a rule database and account information (e.g., account history, account limits, coin types, etc.) retrieved from the broker computing system 208b. An individual data rule (such as an association rule) can include one or more conditions (antecedents) to define when the rule applies and one or more consequences that define outcomes expected to follow if the conditions are met. A rule can be considered to be in scope if the antecedents for the rule are satisfied. A rule can be considered to be satisfied, or valid, if the rule is in scope and all expected consequences of the rule are satisfied. A rule can be used to set values or the rule can be used to determine whether particular data is valid (e.g., satisfies the rule). In some implementations, all or a portion of the individual data rules can be manually entered by the database transaction agent 210b or another user, including variants of rules initially identified by the validation system 212b. For example, individual data rules can be imported from another repository or provided by another process. In some implementations, individual data rules can be associated with result statistics that can provide information about the accuracy of an individual data rule, which can be applied to particular transaction types.

The validation system 212b can generate a validation result for each processed transfer request. The validation result can include a transfer request identifier indicating whether or not the requested transfer is valid or not. For example, the validation system 212b can generate a statement, and can transmit the statement including information detailing request validity, account legitimacy, current coin value balance, current event data, and current transfer coin balance. In response to determining that the transfer is not valid, the validation system 212b can transmit a signal to one or both of the database transaction agent 210b and the broker computing system 208b to terminate communication with the user device 202b and block the requested transfer. In response to determining that the transfer is valid, the validation system 212b can transmit a signal to one or both of the database transaction agent 210b and the broker computing system 208b to further process the validated transaction request.

The broker computing system 208b can be configured to process the validated transfer request. The broker computing system 208b can include an analytics engine 214b, a broker database system 216b, and an analytics library 218b. The broker database system 216b includes an account database 220b configured to store account data for a plurality of users. The account data can be formatted as tables that can include a plurality of rows (or records) and a plurality of columns (or attributes or fields). In some implementations, based on analyzing records for one or more of the tables, associations can be determined between values for particular attributes in one or more tables that enable automatic validation of account activities to ensure account security and to prevent malicious activities related to the user accounts stored in the account database 220b. The account data can be validated by the analytics engine 214b, by executing a brokerage algorithm 222b.

The brokerage algorithm 222b can process at least a portion of the tables in the account database 220b in view of a received transfer request. The analytics library 218b can collect the analytics data the brokerage algorithm 222b required and generated to use it as input for optimizing subsequent analytics (e.g., by using a machine learning algorithm). The brokerage algorithm 222b can calculate an approximation of value (VIIV) for an asset-backed coin that can closely mirror the intrinsic value of the underlying assets represented by the asset-backed coin (ABC). The brokerage algorithm 222b can generate a representation of an iteration of a collective investment vehicle (e.g., electronic funds transfers (EFT)). The calculation results of the brokerage algorithm 222b can be publicly disseminated online, by the broker computing system 208b, via a coin exchange or through the listed exchange systematic investment plan (SIP) or through any digital interface that user 206b and other users can access. The broker computing system 208b can be configured to execute the requested transaction by paying out distributions in cash, while avoiding distributing securities.

Since the coin may be fungible throughout a 24-hour period when certain markets are no longer active, algorithms will be utilized that enable estimation of the intrinsic value of the coin (or other iteration) during those off hours. Applying real-time pricing conditions to the brokerage algorithm 222b can estimate the closed markets in near real-time. As an example, if a portfolio has 50% U.S. listed companies and 50% European companies the VIIV could use real-time prices while either market is open and an algorithm for when the other market is closed. The publicly disseminated price can also have a value to current ETFs in establishing valuations during closed market periods, enabling more efficient off-hours trading for ETFs. User 206b and other coin holders can have enhanced ability to trade peer to peer and establishing a verified third party reference point for off hours will be essential to building credibility and adoption. The peer to peer transfers can happen in real time at an agreed upon price or at some time in the future (e.g., tomorrow's opening, next print, mid-market, end of day, volume weighted average price or another aggregation of prices average). Once the exchange has been agreed upon, the portion of the coins stored in the digital wallet 224*b* that are associated with the agreed transaction can be marked as assigned to the pending settlement and quarantined until the settlement event is triggered to avoid double allocation of a portion of the coins to multiple transactions.

Figure 3A:
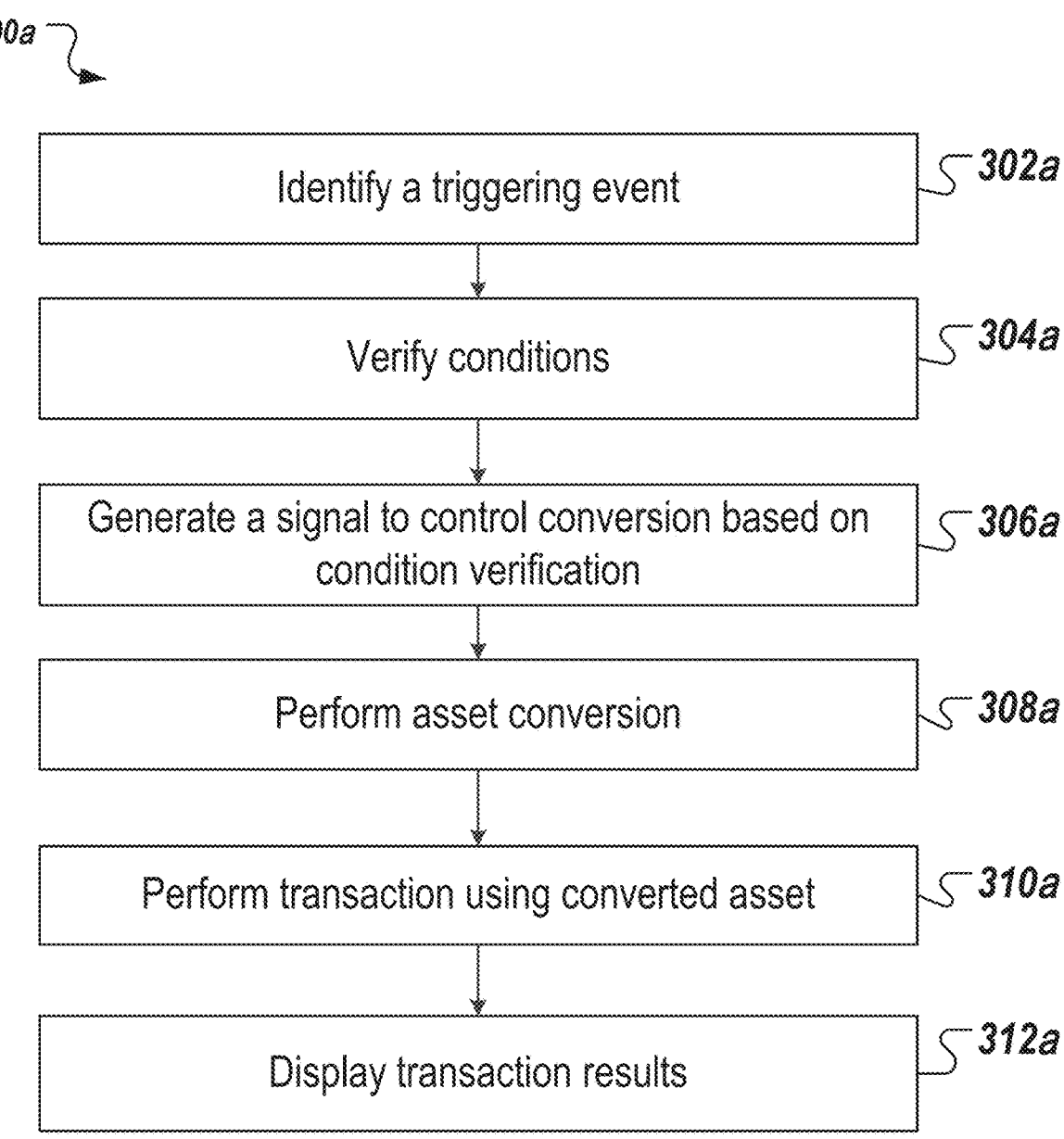
FIG. 3A depicts a first example process in accordance with implementations of the present disclosure.
Figure 3B:
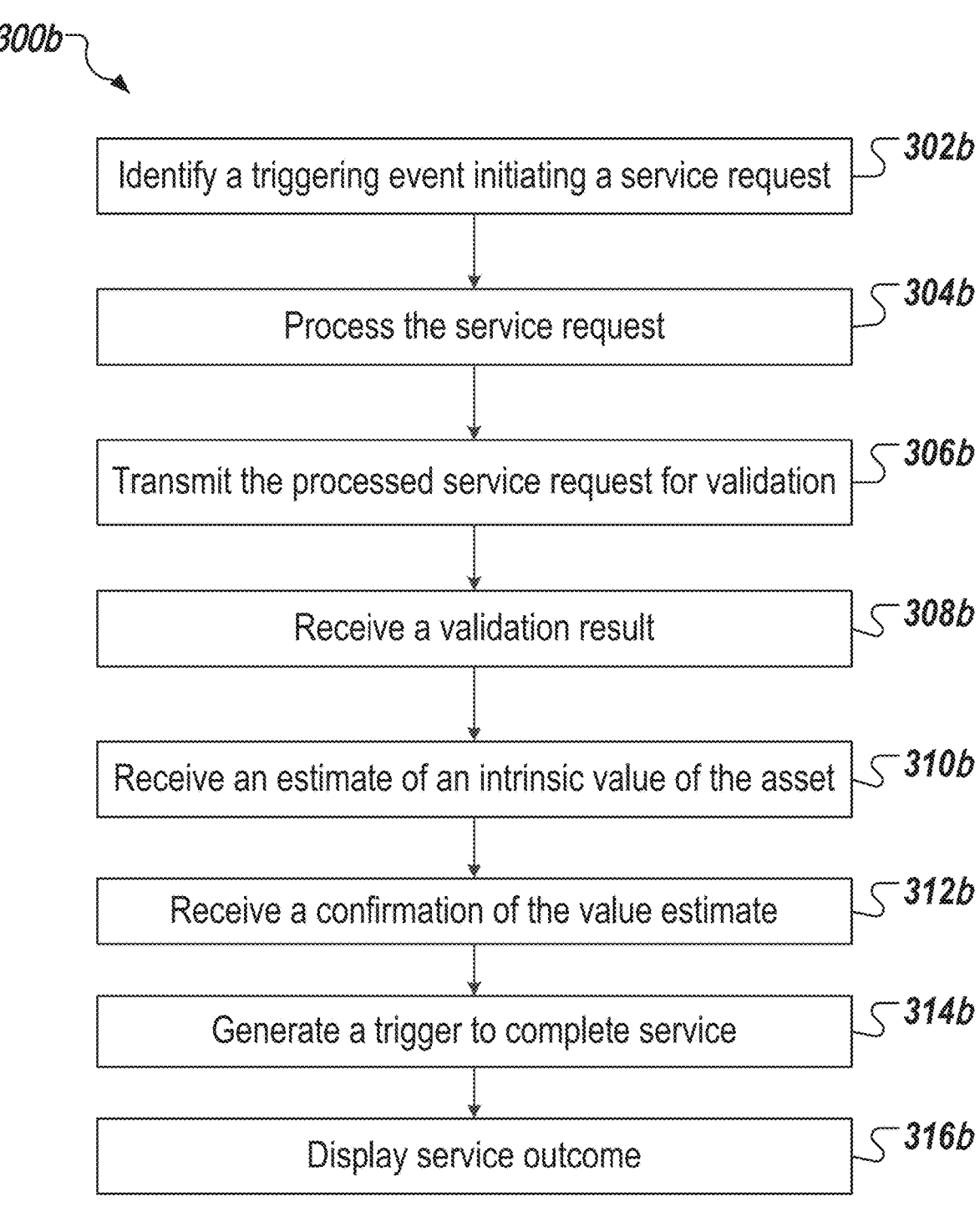
FIG. 3B depicts a second example process in accordance with implementations of the present disclosure.

FIG. 3A is a flow diagram, of an example method 300*a* for automatically completing a secure transaction using converted assets based on a risk and conditions analysis and one or more predefined goals in one example implementation. However, it will be understood that method 300*a* may be performed, for example, by any other suitable system, environment, software, and hardware, or a combination of systems, environments, software, and hardware as appropriate. In some implementations, method 300*a* can be performed by the asset management system 102, or portions thereof, described in FIG. 1, by one or more nodes of the digital ledger network 228*a* described in FIG. 2A, as well as other components or functionality described in other portions of this disclosure. In other implementations, method 300*a* may be performed by a plurality of connected components or systems, such as those illustrated in FIG. 2A. Any suitable system(s), architecture(s), or application(s) can be used to perform the illustrated operations.

In some implementations, method 300*a* describes a method performed within a system of an asset management or card (wallet) provider comprising a communications module, at least one memory, and at least one hardware processor interoperably coupled with the at least one memory and the communications module. The at least one memory can include a repository storing a plurality of customer accounts for one or more customers, a repository storing a catalog of events associated with a transfer program, and a repository storing a plurality of brokerage accounts associated with the transfer program. Each customer account in the plurality of customer accounts can be associated with a particular customer, wherein the customer account stores at least an account balance and an asset conversion event, and, in some implementations, information about customer spending, transactions, and analytics, as well as a customer profile. Each event in the catalog of events corresponds to an asset value cost that may be redeemed or purchases using, in whole or in part, transfer coins from the brokerage account. Each brokerage account can correspond to at least one customer account of the plurality of customer accounts, and each brokerage account may store or be associated with one or more asset types that can be converted to different asset types, a balance of the asset values and at least one event identified as a potential event goal (e.g., asset conversion) for the customer of the corresponding customer account. In some implementations, the at least one event is an event from the asset catalog, and may be manually identified by or automatically determined for the particular customer associated with the brokerage account. The manual identification may be a selection or listing performed by the customer, such as on or through a client device of the customer. The automatic identification may be determined based on a customer analysis, including but not limited to an analysis of prior asset conversions, prior transactions, prior transfer redemptions, and activities associated with the customer account, including calendar events from an account associated with the customer account. The memory may also store instructions that instruct the at least one hardware processor to perform particular operations.

Turning to method 300*a*, at step 302*a*, a triggering event is identified. A triggering event can include a request for a converted asset transaction. In some implementations, the transaction request can include an identifier of the customer account, an identifier of an initial asset type, an identifier of a converted asset type, a value of the convertible asset, and one or more conditions corresponding to the at least one identified event goal. In some implementations, the triggering event may be a periodic account analysis, specific to the customer account or the triggering event may be a batch process performed across some or all of the plurality of accounts. In some implementations, the triggering event may be a manual request from the customer (e.g., via a transfer program application).

In some implementations, the method 300*a* includes generating a private cryptographic key and public cryptographic key as a cryptographic key pair. In some implementations, the method 300*a* includes storing the private cryptographic key and the public cryptographic key in a trusted execution environment (TEE). In some implementations, operations including identifying a triggering event and verifying conditions for performing a service are included in a smart contract, e.g., generated by one or more elements of FIG. 1. For example, the financial institution system 102 can generate a smart contract—e.g., using the processor 106. In some implementations, the financial institution system 102 generates digital currency in response to verifying the conditions for performing a service. For example, the service can include transfer or conversion of assets to digital currency.

In some implementations, a machine learning model is trained to trigger one or more conversions. For example, a machine learning model—e.g., operated by one or more components of FIG. 1—can be trained using request and conversion data. In some implementations, a machine learning model is trained to predict a conversion event. For example, a machine learning model can predict a user will convert a value of ETF to digital currency or vice versa. The machine learning model can be trained online by comparing a generated prediction to data indicating whether or not a user requested a given conversion (e.g., a specific quantity of coins to ETF or ETF to digital currency).

At step 304*a*, transfer request conditions are verified. The verification can include, e.g., processing of a set of relevant customer account information and brokerage account information to verify conditions to complete the conversion process and to analyze security and validity of the transaction. The set of information relevant to the analysis can include any information relevant to the conversion program, and may be defined or determined by a set of asset conversion rules managed by a transfer management system. For example, the customer account can be accessed to obtain account information of the customer, historical transactions (to identify suspicious transaction requests associated with possible malicious behavior), conversion options and limits associated with the account and information from a related brokerage account. The brokerage account information obtained can include a current balance of a particular asset type corresponding to the brokerage account and at least one identified event goal, including the asset value cost of the event associated with the event goal. The asset type can include cash (corresponding to a set currency), virtual coins, securities, ETF, and any other type of financial instruments that could be used for performing a financial transaction. In the current solution, the event may be associated with an asset conversion event with or without a transaction. In some implementations, the verification of the transfer request conditions includes a calculation of a predicted value of the converted asset type, a display of the predicted value of the converted asset type, and a request for a customer approval to complete the conversion. In some implementations, the verification of the transfer request conditions includes a calculation of an asset value difference and a comparison to a threshold range for approved transactions.

At 306*a*, a signal to control the asset conversion is generated based on the outcome of the verification process. For example, if the outcome of the verification process for the customer account indicates that all conversion and transaction conditions are satisfied and the customer approves the conversion and transaction, the signal can include a trigger to initiate the asset conversion. If the outcome of the verification process for the customer account indicates that at least one of the conversion and transaction conditions are not satisfied or the customer denies the conversion or the transaction, the signal can include a trigger to block the asset conversion and transaction by interrupting a connection to a network or a connection between two or more systems needed to complete the transaction.

In some implementations, a verification process is performed by a smart contract. For example, one or more elements of the system 100 of FIG. 1 or the system 200*a* can generate a smart contract configured to perform one or more actions for checking criteria before converting or exchanging value for one or more entities. In some implementations, generating a smart contract includes generating one or more instructions, generating a hash of one or more of the instructions, and storing the generated hash in a decentralized blockchain. In some implementations, the broker computing system 204*a* generates a smart contract and provides the smart contract to the user device 202*a*. For example, the broker computing system 204*a* can generate a smart contract in a decentralized blockchain. The user device 202*a* can be a member of the blockchain or be communicably connected to a member of the blockchain to generate a local copy of the smart contract or access a copy of the smart contract available on one or more other devices. The smart contract can be executed on the user device 202*a*, the broker computing system 204*a*, or one or more other computing devices described in this document. In some implementations, a checking process is performed in a trusted execution environment (TEE). For example, on one or more computing devices, a verification of assets or entities engaged in conversion or transfer can be performed in a TEE The TEE can be used exclusively for verification or can be combined with additional processes. The TEE can help ensure that a verification process is not compromised by hacking attempts or other methods of evading a full verification or execution of conversion or trading processes.

At 308*a*, in response to the signal including a trigger to initiate the asset conversion, a selected portion of the asset amount is converted from a first asset type to a second asset type of a corresponding value (e.g., in the manner described above with reference to FIGS. 1 and 2A). In some implementations, the determined converted asset balance is provided to the customer associated with the customer account.

In some implementations, generating a signal to control conversion based on condition verification and performing asset conversion are included in generating digital currency. For example, one or more computing elements described in this document can generate digital currency by, e.g., generating a signal to control conversion based on condition verification and performing asset conversion.

At 310*a*, in response to determining that asset conversion is completed and a preapproved transaction is to be made to the customer, a transaction for a converted asset can be initiated. In some implementations, the transaction can be executed by an asset management and/or one or more nodes of the digital ledger network (e.g., a blockchain network). Digital ledger technology can support the customer (user) to initiate transactions by creating and invoking complex logic in the digital ledger network using different asset types, including virtual (bitcoin) technology. In the deployment phase, the user can send a transaction for creating a smart contract. The data field of the transaction can include a code (such as a bytecode) of the smart contract. After diffusion and consensus of the transaction, each node in the digital ledger network can execute the transaction by using the converted asset parameters, and generate a corresponding contract instance, so as to complete deployment of the smart contract. In a blockchain network implementation, a blockchain node can have a contract account corresponding to the smart contract, and the contract account has a specific contract address. In the invoking phase, a user (which can be the same as or different from the user deploying the smart contract) sends a transaction used to invoke a smart contract to the blockchain network, where the from field of the transaction is an address of an external account corresponding to the user, the to field is a contract address of the smart contract that needs to be invoked, and the data field includes a method and a parameter for invoking the smart contract. After consensus is reached between the nodes by using the consensus mechanism, the smart contract invoked as declared by the above transaction is independently executed on each node of the blockchain network in a selected method, and all execution records and data are stored in the blockchain. Therefore, after the transaction is completed, transaction records that cannot be tampered with and will not be lost are stored in the blockchain.

Each digital ledger network node can create and invoke a smart contract by using a virtual machine. It is a challenge for privacy protection to store transactions that include smart contracts and execution results of transactions in a digital ledger, or to store all ledgers on each full node in the digital ledger. Privacy protection can be implemented by using a plurality of technologies, such as cryptography technologies (such as homomorphic encryption or zero-knowledge proof), hardware privacy technologies, and network isolation technologies.

The hardware privacy protection technologies can include a trusted execution environment (TEE). For example, the nodes can implement a secure execution environment for digital ledger transactions by using the TEE. The TEE is a trusted execution environment that is based on a secure extension of CPU hardware and fully isolated from the outside. TEEs can include a trusted platform module (TPM) in a software aspect and Intel Software Guard Extensions (SGX), ARM Trustzone, and AMD Platform Security Processor (PSP) in a hardware aspect. The TEE can function as a hardware black box. Codes and data executed in the TEE cannot be viewed even at an operating system level, and can be operated only by using an interface predefined in the codes. In terms of efficiency, because of the black box nature of the TEE, an operation in the TEE is performed on plaintext data instead of a complex cryptographic operation in homomorphic encryption, and efficiency of a calculation process can be improved for additional privacy and security. In the examples provided in this document, TEE on one or more node devices can be used to execute operations of asset conversion or transfer of value.

In the implementations of the present specification, a privacy computing unit can be deployed on a node on a blockchain system, or can be deployed on a device outside the blockchain system. If the privacy computing unit is a blockchain node, the privacy computing unit in the blockchain node can be used for executing the blockchain transaction in a trusted and secret way. A virtual machine can be run in the TEE, so a contract is executed by using the virtual machine. As such, for an encrypted transaction for invoking a contract that is sent to the privacy computing unit of the blockchain node, the privacy computing unit can decrypt and execute the encrypted transaction in the virtual machine loaded in the privacy computing unit, and can encrypt and output an execution result. The technology for remote attestation can prove that it is legitimate, and programs executed therein (e.g., virtual machine codes) are consistent with expectations. The invoked contract, as described above, can be deployed on the blockchain in advance. The deployed contract, through codes therein, can initiate an access request to data outside the blockchain during execution, or can send an execution result to another physical or logical entity outside the blockchain after execution ends. Specifically, as described below, the execution result of the smart contract can be transmitted by the TEE in the blockchain node to the first institution and the second institution by using an oracle mechanism. Each blockchain node creates and invokes a smart contract by using a virtual machine. Compared to using the TEE technology to protect privacy on each node in the blockchain network, a privacy computing node (e.g., an off-chain privacy computing node, also referred to as a "privacy computing unit" in the implementations of the present disclosure) can be deployed outside the blockchain network (or referred to as "off-chain"), so computing operations that originally need to be performed on all the blockchain nodes are transferred to the off-chain privacy computing node for execution. Based on a verifiable computation technology, it can be proven that the previously-mentioned computing results are actually performed as expected in the TEE, thereby ensuring reliability while reducing on-chain resource consumption.

An off-chain TEE, created on the off-chain privacy computing node is similar to the on-chain TEE created on the blockchain node, and can be a TEE implemented based on CPU hardware and fully isolated from the outside. After creating the off-chain TEE, the off-chain privacy computing node can implement a deployment operation on an off-chain contract and an operation of invoking the contract after the deployment by using the off-chain TEE, and ensure data security in the operation process. Before being used, the privacy computing node can prove to a user that the privacy computing node is trustworthy. The process of proving itself trustworthy may involve a remote attestation report. The processes that the on-chain and off-chain privacy computing nodes prove themselves trustworthy are similar. Using the off-chain privacy computing node as an example, a remote attestation report is generated in a remote attestation process for the off chain TEE on the off-chain privacy computing node. The remote attestation report can be generated after an authoritative authentication server verifies self-recommendation information generated by the off-chain privacy computing node. The self-recommendation information is related to the off-chain TEE created on the off-chain privacy computing node. The off-chain privacy computing node generates the self-recommendation information related to the off-chain TEE, and after the authoritative authentication server verifies the self-recommendation information, the remote attestation report is generated, so the remote attestation report can be used to indicate that the off-chain TEE on the off-chain privacy computing node is trustworthy.

For example, before the privacy computing unit obtains the transaction risk information provided by the first institution, as the verification result, the first institution can first verify whether the off-chain privacy computing unit is trustworthy. Specifically, the first institution can challenge the off-chain privacy computing node, and receive the remote attestation report returned by the off-chain privacy computing node. For example, the first institution can initiate an off-chain challenge to the off-chain privacy computing node, that is, the process of initiating the challenge can be independent of the blockchain network, so a consensus process between the blockchain nodes can be skipped and on-chain and off-chain interoperability can be reduced. Therefore, the challenge of the first institution to the off-chain privacy computing node has higher operational efficiency. For another example, the asset management can use an on-chain challenge, for example, the asset management can submit a challenge transaction to the blockchain node. Challenge information contained in the challenge transaction can be transmitted by the blockchain node to the off-chain privacy computing node by using the oracle mechanism, and the challenge information is used to challenge the off-chain privacy computing node. Regardless of the previously-mentioned on-chain challenge or the off-chain challenge, after obtaining the remote attestation report, a challenger (such as the asset management) can verify a signature of the remote attestation report based on a public key of the authoritative authentication server, and if the verification succeeds, can acknowledge that the off-chain privacy computing node is trustworthy.

The off-chain privacy computing platform can store a pair of public and private keys in the TEE. The public key can be sent to a counterpart in a process such as a remote attestation process, and the private key is properly stored in the TEE. When it is determined, based on the remote attestation report, that the off-chain privacy computing node is trustworthy, the asset management can encrypt and transmit a bytecode of the off-chain contract to the off-chain privacy computing node, and the off-chain privacy computing node obtains the bytecode through decryption in the off-chain trusted execution environment and deploys the bytecode. The previously-mentioned encryption can use the public key. In the previously-mentioned process, after a contract is deployed on the off-chain privacy computing node, the contract can be stored, and a hash value of the contract is calculated. The hash value of the contract can be fed back to the deployer of the contract. The deployer can locally generate a hash value for the deployed contract. Therefore, the deployer can compare whether a hash value of the deployed contract is the same as the local contract hash value. If they are the same, it indicates that the contract deployed on the off-chain privacy computing node is a contract deployed by the deployer. Content sent from the off-chain privacy computing node can be signed by using a private key stored in the TEE, so as to prove that the content is a result of execution by the TEE. Actually, a plurality of smart contracts can be deployed in the TEE, and the TEE can generate a separate pair of public and private keys for each smart contract. Therefore, each deployed smart contract can have an ID (for example, a public key corresponding to the smart contract or a character string generated based on the public key), and a result of execution of each smart contract can also be signed by using a private key that is properly stored in the TEE and corresponding to the smart contract. As such, it can be proved that a result is a result of execution of a specific contract in the off-chain privacy computing node. As such, execution results of different contracts can be signed by different private keys. Only a corresponding public key can verify the signature, or if a corresponding public key cannot verify the signature, it cannot be proved that the result is an execution result of a corresponding contract. Therefore, it is equivalent to that an identity is assigned to the contract deployed in the off-chain privacy computing node by using a pair of public and private keys. The previous description uses the off-chain privacy contract as an example. The on-chain privacy contract is also similar, and can also have an identity, that is, have a pair of public and private keys.

Subsequently, the off-chain privacy computing node can invoke the deployed off-chain contract. Specifically, when the deployed off-chain contract is invoked, a bytecode of the deployed contract can be loaded and executed in the off-chain trusted execution environment, and an execution result can be fed back to an invoker of the contract, or fed back to a recipient specified in the contract or a recipient specified in a transaction for invoking the contract, or fed back to the blockchain node by using the oracle mechanism. The execution result fed back to the blockchain node by using the oracle mechanism can be further fed back to the recipient specified in the on-chain contract or to the recipient specified in the transaction for invoking the on-chain contract via the setting of the on-chain contract. In addition, the execution result of the off-chain privacy computing node can be output after being encrypted by using a key. For example, in an asymmetric encryption method, a public key used for encryption can be a public key in a pair of public and private keys negotiated in the previously-mentioned challenge process, or can be sent by a challenger to the off-chain privacy computing node after being generated by using the transaction service. The challenger here can be the first institution in the implementations of the present specification. Therefore, in the previously-mentioned method, it can be ensured that all data entering or exiting the off-chain privacy computing node is encrypted, so as to ensure security in a data transmission process. Similarly, data entering the off-chain privacy computing node can be signed by a sender by using a key of the sender, so as to prove, by using a signature verification process, that the data is sent by the sender, and content is complete and is not tampered with. The principles in the subsequent similar steps are the same.

In response to completing the transaction, method 300a continues to 312a, where the results of the transaction are displayed for the customer account and one or more predefined fields of the customer account are updated based on the accepted transaction. In some implementations, a statement generation process may also be performed after the transaction is completed. The statement generation process may be performed individually for each customer account, or as a part of a batch process performed across each of the plurality of customer accounts. The statement generation process may be a typical statement generation process obtaining information included in each of the customer account and brokerage account for each customer. The standard process can be updated, however, to be interrupted when an event data is identified when reviewing the customer account. When the event data is detected, the statement generation process can interrupts its standard process and perform a determination of the exact event data. Using the determined event data, the value of the event data balance can be inserted into and included in the generated statement. Once generated, the statement can be stored in association with the customer account and/or transmitted, via a communications module, to a client device associated with the corresponding customer.

In some implementations, the method 300a includes training a machine learning model to generate the triggering event for generating the digital currency. For example, training a model can include obtaining data representing user requests for generating the digital currency or other assets; and providing the data representing user requests for generating the digital currency or other assets to an input layer of a neural network; and in response to providing the data representing user requests for generating the digital currency or other assets to the input layer of the neural network, adjusting one or more weights or parameters. In some implementations, training a model to predict conversions or generating requests improves efficiency of a conversion system. For example, by predicting conversions, a computing system—such as the financial institution system 102—can pre-process one or more data items such that, when conversion or generation, or other service, is requested by a user explicitly, one or more processing stages have already been completed. In this way, responsiveness can be improved and completion time for operations requested can be reduced.

In some implementations, generating a digital currency includes generating a virtual coin, a security, a mutual fund, exchange-traded product, or an exchange-traded fund. For example, a computing element, such as the financial institution system 102, can generate a signal to update one or more bytes of computer memory to represent an asset stored as a virtual coin, a security, a mutual fund, exchange-traded product, or an exchange-traded fund. In some implementations, generating a digital currency includes writing details of one or more assets in a blockchain. For example, a computing element, such as the financial institution system 102, can transmit one or more details of an asset to be generated (e.g., converted, transferred, among others) to one or more nodes of a blockchain. The details can be hashed—e.g., by the computing element-using a symmetric key where a public key available to other nodes in a blockchain is accessible to read the details of the asset generated.

In some implementations, generating digital currency includes converting an asset from a first asset type to a second asset type. For example, the first asset type can include an exchange-traded fund (ETF) and the second asset type can include a digital coin stored electronically in user wallets in a decentralized blockchain. In some implementations, the first asset type and the second asset type include one of a physical coin corresponding to a currency, a virtual coin, a security, a mutual fund, exchange-traded product, or an exchange-traded fund (ETF). In some implementations, a transaction includes performing a transaction using the second asset type. For example, a transaction can be performed in a blockchain using digital currency in the form of virtual coins recorded in blockchain ledger. In some implementations, the method 300a performing a verification of transaction conditions for performing the transaction using the second asset type. For example, a computing element, such as one or more computing elements of the financial institution system 102, can determine if one or more digital coins have been spent or loaned or otherwise removed from a user's account. The verification of transaction conditions can include conditions to prevent double spending including checking a blockchain ledger for previous instances of the non-fungible coins being used previously in a transaction. The verification of transaction conditions can be performed by a smart contract operating in a blockchain where the smart contract can be generated by a computing element e.g., of the financial institution system 102.

In some implementations, the value of the digital coin is a percentage of a net asset value (NAV) of the ETF. In some implementations, the method 300a includes generating additional digital coins for each owner of an originally issued digital coin where the value of each of the digital coins is less than the value when originally issued e.g., based on an updated value for each coin (where value can be determined using one or more techniques described in this document).

In some implementations, one or more operations included in the method 300a are optional. For example, a computing device can perform one or more operations of the method 300a but omit one or more other operations described as being included in the method 300a. In some implementations, the operation of performing a transaction using a converted asset (310a) is omitted. In some implementations, the operation of displaying transaction results (312a) is omitted. For example, a computing device can identify a triggering event, verify conditions, and generate a signal to convert without performing one or more subsequent actions.

FIG. 3D is a flow diagram of an example method 300b for automatically calculating and disseminating an approximate value for an asset-backed coin that closely mirrors the intrinsic value of underlying assets represented by the asset-backed coin, which serves as a representation of a second iteration of the same investment vehicle in one example implementation. However, it will be understood that method 300b may be performed, for example, by any other suitable system, environment, software, and hardware, or a combination of systems, environments, software, and hardware as appropriate. In some implementations, method 300b can be performed by the asset management system 102, or portions thereof, described in FIG. 1, by one or more nodes of the digital ledger network 228b (e.g., a blockchain network) described in FIG. 2B, as well as other components or functionality described in other portions of this disclosure. In other implementations, method 300b may be performed by a plurality of connected components or systems, such as those illustrated in FIG. 213. Any suitable system(s), architecture(s), or application(s) can be used to perform the illustrated operations.

In some implementations, method 300b describes a method performed within a system of an asset management or card (wallet) provider comprising a communications module, at least one memory, and at least one hardware processor interoperably coupled with the at least one memory and the communications module. The at least one memory can include a repository storing a plurality of customer accounts for one or more customers, a repository storing a catalog of events associated with a transfer program, and a repository storing a plurality of brokerage accounts associated with the transfer program. Each customer account in the plurality of customer accounts can be associated with a particular customer, wherein the customer account stores at least an account balance and an asset backed coin event, as well as in some implementations information about customer spending, transactions, and analytics, as well as a customer profile. Each event in the catalog of events corresponds to an asset value cost that may be redeemed or purchases using, in whole or in part, transfer coins from the brokerage account. Each brokerage account can correspond to at least one customer account of the plurality of customer accounts, and each brokerage account may store or be associated with one or more asset backed coins for the customer of the corresponding customer account. In some implementations, the at least one event is an event from the asset catalog, and may be manually identified by or automatically determined for the particular customer associated with the brokerage account. The manual identification may be a selection or listing performed by the customer, such as on or through a client device of the customer. The automatic identification may be determined based on a customer analysis, including but not limited to an analysis of prior estimations of asset-backed coin values, prior transactions, prior transfer redemptions, and activities associated with the customer account, including calendar events from an account associated with the customer account. The memory may also store instructions that instruct the at least one hardware processor to perform particular operations.

Turning to method 300b, at 302b a triggering event including a request for a service (e.g., transaction) including an asset-backed coin can be identified. The service request can include an identifier of the customer account, an identifier of an initial asset type, an identifier of an asset type, a value of the associated asset, and one or more conditions corresponding to the at least one identified event goal. In some implementations, the triggering event may be a periodic account analysis, specific to the customer account or triggering event may be a batch process performed across some or all of the plurality of accounts. In some implementations, the triggering event may be a manual request from the customer (e.g., via a transfer program application). In other implementations, one or more account events may trigger the initiation of a real time estimate of the asset-backed coin value and transaction analysis, such as a large transaction being processed, a determination that multiple parties involved in the service execution review the asset value estimate, or any other suitable event(s). In some implementations, the trigger may be initiated by a transfer management system.

At 304b, the service request can be automatically processed to ensure user data security. For example, the service request processing can include an encryption of a filtered version of the service request to generate a safe transfer request that can prevent malicious data parties from accessing private user data. In some implementations, the service request is encrypted using a private key of a public-private key pair generated by a transfer management system. In some implementations, tokens or portions of tokens may be used to substitute or obfuscate a user account number, user name, pin number, routing information related to the asset management associated with the account, security code, or other information relating to the user account.

At 306b, the processed service request can be transmitted to a communicably coupled computing system (e.g., the broker computing system 208b or the database transaction agent 210b described with reference to FIG. 2B) to be further processed and validated. In some implementations, the user device transmits the processed service request with a request to validate and verify the processed transfer requests. The verification can include processing of a set of relevant customer account information and brokerage account information that can be accessed to verify conditions to complete the estimation of the asset backed coin value process and to analyze security and validity of transaction. The set of information relevant to the analysis may include any information relevant to the estimation of the asset backed coin value program, and may be defined or determined by a set of asset backing rules managed by a transfer management system. For example, the customer account can be accessed to obtain account information of the customer, historical transactions (to identify suspicious transaction requests associated with possible malicious behavior), evaluation of asset types available for backing coins and limits associated with the account and information from a related brokerage account. The brokerage account information obtained can include a current balance of a particular asset type corresponding to the brokerage account and at least one identified event goal, including the asset value cost of the event associated with the event goal. The asset type can include cash (corresponding to a set currency), virtual coins, securities, ETF, and any other type of financial instruments that could be used for performing a financial transaction. In the current solution, the event may be associated with an estimation of the asset backed coin value event with or without a transaction involving the asset backed coin. In some implementations, the verification of the transfer request conditions includes a calculation of a predicted value of the asset backed coin, a display of the predicted value of the asset backed coin based on the asset type, and a request for a customer approval to complete the process. In some implementations, the verification of the transfer request conditions includes a calculation of an asset value difference and a comparison to a threshold range for approved transactions.

At 308b, a validation result is received based on the outcome of the verification process. For example, if the outcome of the verification process for the customer account indicates that all service conditions are satisfied and the customer approves the estimation of the asset backed coin value and transaction, the validation result can generate a signal that includes a trigger to initiate completion of the service. If the outcome of the verification process for the customer account indicates that at least one of the service conditions are not satisfied or the customer denies the estimated value or the transaction, the signal can include a trigger to block the service by interrupting a connection to a network or a connection between two or more systems needed to complete the service.

At 310b, an approximation of value (VIIV) for an asset-backed coin can be received from a computing system configured to perform the estimation of the asset backed coin value (e.g., brokerage algorithm 222b described with reference to FIG. 2B). The VIIV can closely mirror the intrinsic value of the underlying assets represented by the asset backed coin (ABC). The estimation of the asset backed coin value can include a representation of an iteration of a collective investment vehicle (e.g., electronic funds transfers (EFT)). The estimation of the asset backed coin value can be publicly disseminated online via a coin exchange or through the listed exchange systematic investment plan (SIP) or through any digital interface that one or more users can access. Since the coin may be fungible throughout a 24-hour period when certain markets are no longer active, the estimation of the asset backed coin value can be based on algorithms that adjust the intrinsic value of the coin (or other iteration) relative to those off hours by applying real-time pricing conditions to estimate the closed markets in near real-time. The publicly disseminated price can also have a value to current ETFs in establishing valuations during closed market periods, enabling more efficient off-hours trading for ETFs.

At 312b, a confirmation or approval of the estimation of the asset backed coin value can be received from one or more parties to whom the estimated value was disseminated. In some implementations, if the estimated value was disseminated to a selected number of parties involved in the requested service, approval and confirmation of the estimated value is requested from all parties for completing the service, which is otherwise aborted.

At 314b, in response to determining that all parties approve the estimated value and the transaction is valid, a transaction using the asset backed coin can be initiated. For example, once the exchange has been agreed upon, the portion of the coins stored in the digital wallet that are associated with the agreed transaction can be marked as assigned to the pending settlement and quarantined until the settlement event is triggered to avoid double allocation of a portion of the coins to multiple transactions. The broker computing system can be configured to execute the requested transaction by paying out distributions in cash, while avoiding distributing securities. A user and other coin holders can have enhanced ability to trade peer to peer and establishing a verified third party reference point for off hours will be essential to building credibility and adoption. The peer to peer transfers can happen in real time at an agreed upon price or at some time in the future (e.g., tomorrow's opening, next print, mid-market, end of day, volume weighted average price or another aggregation of prices average).

In response to completing the transaction, method 300b continues to 316b, where the results of the transaction are displayed for the customer account and one or more pre-defined fields of the customer account are updated based on the accepted transaction. In some implementations, a statement generation process may also be performed after the transaction is completed. The statement generation process may be performed individually for each customer account, or as a part of a batch process performed across each of the plurality of customer accounts. The statement generation process may be a typical statement generation process obtaining information included in each of the customer account and brokerage account for each customer. The standard process can be updated, however, to be interrupted when an event data is identified when reviewing the customer account. When the event data is detected, the statement generation process can interrupt its standard process and perform a determination of the exact event data. Using the determined event data, the value of the event data balance can be inserted into and included in the generated statement. Once generated, the statement can be stored in association with the customer account and/or transmitted, via a communications module, to a client device associated with the corresponding customer.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of particular implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

Implementations of the subject matter and the operations described in this specification can be implemented in digital electronic circuitry, in tangibly-embodied digital computer software or firmware, in digital computer hardware, including the structures disclosed in this specification and their structural equivalents, or in combinations of one or more of them.

Implementations of the digital subject matter described in this specification can be implemented as one or more digital computer programs, i.e., one or more modules (or engines) of digital computer program instructions encoded on a tangible non-transitory storage medium for execution by, or to control the operation of, data processing apparatus. The digital computer storage medium can be a machine-readable storage device, a machine-readable storage substrate, a random or serial access memory device, one or more qubits, or a combination of one or more of them. Alternatively or in addition, the program instructions can be encoded on an artificially-generated propa gated signal that is capable of encoding digital, e.g., a machine-generated electrical, optical, or electromagnetic signal, that is generated to encode digital information for transmission to suitable receiver apparatus for execution by a data processing apparatus.

The term "data processing apparatus" refers to digital data processing hardware and encompasses all kinds of apparatus, devices, and machines for processing digital data, including by way of example a programmable digital processor, a programmable processor, a digital computer, multiple digital processors or computers, and combinations thereof. The apparatus can also be, or further include, special purpose logic circuitry, e.g., an FPGA (field programmable gate array), or an ASIC (application-specific integrated circuit). The apparatus can optionally include, in addition to hardware, code that creates an execution environment for digital computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment.

A digital computer program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub-programs, or portions of code. A digital computer program can be deployed to be executed on one digital computer or on multiple digital computers that are located at one site or distributed across multiple sites and interconnected by a digital data communication network.

The processes and logic flows described in this specification can be performed by one or more programmable digital computers, operating with one or more digital processors, as appropriate, executing one or more digital computer programs to perform functions by operating on input digital data and generating output. The processes and logic flows can also be performed by, and apparatus can also be implemented as, special purpose logic circuitry, e.g., an FPGA or an ASIC, or by a combination of special purpose logic circuitry and one or more programmed digital computers.

For a system of one or more digital computers to be "configured to" perform particular operations or actions means that the system has installed on it software, firmware, hardware, or a combination of them that in operation cause the system to perform the operations or actions. For one or more digital computer programs to be configured to perform particular operations or actions means that the one or more programs include instructions that, when executed by digital data processing apparatus, cause the apparatus to perform the operations or actions.

Digital computers suitable for the execution of a digital computer program can be based on general or special purpose digital processors, or any other kind of central digital processing unit. Generally, a central digital processing unit will receive instructions and digital data from a read-only memory, a random access memory.

The essential elements of a digital computer are a central processing unit for performing or executing instructions and one or more memory devices for storing instructions and digital data. The central processing unit and the memory can be supplemented by, or incorporated in, special purpose logic circuitry. Generally, a digital computer will also include, or be operatively coupled to receive digital data from or transfer digital to, or both, one or more mass storage devices for storing digital data, e.g., magnetic, magneto-optical disks, or optical disks. However, a digital computer need not have such devices.

Digital computer-readable media suitable for storing digital computer program instructions and digital data include all forms of non-volatile digital memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks.

Control of the various systems described in this specification, or portions of them, can be implemented in a digital computer program product that includes instructions that are stored on one or more non-transitory machine-readable storage media, and that are executable on one or more digital processing devices. The systems described in this specification, or portions of them, can each be implemented as an apparatus, method, or system that may include one or more digital processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system, comprising:

one or more computers; and one or more computer memory devices interoperably coupled with the one or more computers and having tangible, non-transitory, machine-readable media storing one or more instructions comprising a smart contract, the instructions, when executed by the one or more computers, perform one or more operations comprising:

generating a private cryptographic key and public cryptographic key as a cryptographic key pair;

storing the private cryptographic key and the public cryptographic key in a trusted execution environment (TEE);

identifying, by the smart contract, a triggering event generated using a machine learning model, the triggering event comprises a request to perform a service comprising canceling shares of an exchange-traded fund and creating a digital coin stored in a blockchain, wherein each of the shares of the exchange-traded fund and the digital coin represents a common portfolio of securities held at a securities depository, wherein the machine learning model is trained using training data including data representing requests for canceling shares of one or more exchange-traded funds and creating one or more digital coins and wherein training the machine learning model using the training data results in adjustment of one or more weights or parameters of the machine learning model;

in response to identifying the triggering event and prior to performing the requested service, calculating, by the smart contract, a real-time intrinsic value for the digital coin based on the portfolio of securities;

in response to calculating the real-time intrinsic value for the digital coin, canceling, by the smart contract, the shares of the exchange-traded fund at the securities depository and in response to canceling the shares, creating, by the smart contract, the digital coin stored in the blockchain, wherein creating the digital coin comprises generating a quantity of the digital coin having a value equal to a value of the canceled shares so that the shares and the digital coin collectively represent the common portfolio of securities;

generating a hash value representing the smart contract using the private cryptographic key;

transmitting the hash value representing the smart contract to a privacy computing platform; and transmitting the public cryptographic key to the privacy computing platform configured to decrypt the hash value representing the smart contract.

2. The system of claim 1, wherein a value of the digital coin is a percentage of a net asset value (NAV) of the exchange-traded fund.

3. The system of claim 2, wherein the operations comprise:

generating additional digital coins for each originally issued digital coin, wherein a value of each of the additional digital coins is less than a value of each originally issued digital coin.

4. The system of claim 1, wherein the operations comprise:

performing a transaction using the digital coin created after canceling the shares of the exchange-traded fund.

5. The system of claim 4, wherein the operations comprise:

displaying a result of the transaction.

6. The system of claim 4, wherein the operations comprise:

performing a verification of transaction conditions for performing the transaction using the digital coin.

7. The system of claim 1, wherein the operations comprise:

providing data representing one or more service requests to an input layer of a neural network.

8. The system of claim 1, wherein the operations comprise verifying conditions for canceling shares comprising verifying an eligibility status of the shares prior to canceling the shares of the exchange-traded fund.

9. The system of claim 8, wherein verifying the eligibility status of the shares comprises querying a brokerage record associated with the shares and determining that the shares are not subject to an encumbrance.

10. The system of claim 9, the encumbrance comprising at least one of a lien, an outstanding loan, or an associated option position.

11. The system of claim 1, wherein calculating the real-time intrinsic value for the digital coin based on the portfolio of securities comprises: (i) identifying a first portion of the portfolio of securities associated with a currently open market; (ii) identifying a second portion of the portfolio of securities associated with a currently closed market; and (iii) generating a composite price using real-time pricing for the first portion and a predictive algorithm for the second portion.

12. A non-transitory computer-readable medium storing one or more instructions, comprising a smart contract, executable by a computer system to perform operations comprising:

generating a set of cryptographic keys and storing the set of cryptographic keys in a trusted execution environment (TEE);

identifying, by the smart contract, a triggering event generated using a machine learning model, the triggering event comprises a request to perform a service comprising converting a first digital asset representing an exchange-traded fund with shares available on one or more exchanges to a second digital asset of a second asset type that is different from the first digital asset, wherein the second digital asset of the second asset type is a digital coin, wherein each of the shares of the exchange-traded fund and the digital coin represents a common portfolio of securities held at a securities depository, wherein the machine learning model is trained using training data including data representing requests for converting one or more digital assets from one type to another type, and wherein training the machine learning model using the training data results in adjustment of one or more weights or parameters of the machine learning model;

in response to identifying the triggering event and prior to performing the requested service, calculating, by the smart contract, a real-time intrinsic value for the digital coin based on the portfolio of securities;

in response to calculating the real-time intrinsic value for the digital coin, canceling, by the smart contract, the shares of the exchange-traded fund and in response to canceling the shares, creating, by the smart contract, the digital coin stored in a blockchain, wherein creating the digital coin comprises generating a quantity of the digital coin having a value equal to a value of the canceled shares so that the shares and the digital coin collectively represent the common portfolio of securities;

generating a hash value representing the smart contract using a key of the set of cryptographic keys;

transmitting the hash value representing the smart contract to a privacy computing platform; and transmitting at least one key of the set of cryptographic keys to the privacy computing platform configured to decrypt the hash value representing the smart contract.

13. The non-transitory computer-readable medium of claim 12, wherein the second digital asset corresponds to a currency, a virtual coin, a security, a mutual fund, or an exchange-traded product.

14. The non-transitory computer-readable medium of claim 12, wherein the second asset type is a digital coin stored electronically in user wallets in a blockchain, wherein converting the first digital asset to the second digital asset comprises canceling the shares of the exchange-traded fund and creating the digital coin stored in the blockchain.

15. The non-transitory computer-readable medium of claim 14, wherein a value of the digital coin is a percentage of a net asset value (NAV) of the exchange-traded fund.

16. The non-transitory computer-readable medium of claim 12, wherein the operations comprise:

providing data representing one or more service requests to an input layer of a neural network.

17. A system comprising:

one or more computers; and one or more computer memory devices interoperably coupled with the one or more computers and having tangible, non-transitory, machine-readable media storing one or more instructions, comprising a smart contract, the instructions, when executed by the one or more computers, perform one or more operations comprising:

generating a private cryptographic key and public cryptographic key as a cryptographic key pair;

storing the private cryptographic key and the public cryptographic key in a trusted execution environment (TEE);

identifying, by the smart contract, a triggering event generated by a machine learning model, the triggering event comprises a request to perform a service comprising converting a digital coin stored in a blockchain to shares of an exchange-traded fund, wherein each of the shares of the exchange-traded fund and the digital coin represents a common portfolio of securities held at a securities depository, wherein the machine learning model is trained using training data including data representing requests for converting one or more digital assets from one type to another type, and wherein training the machine learning model using the training data results in adjustment of one or more weights or parameters of the machine learning model;

in response to identifying the triggering event and prior to performing the service, calculating, by the smart contract, a real-time intrinsic value for the digital coin based on the portfolio of securities;

in response to calculating the real-time intrinsic value for the digital coin, canceling, by the smart contract, the digital coin stored in the blockchain and in response to canceling the digital coin, creating, by the smart contract, the shares of the exchange-traded fund at the securities depository, wherein creating the shares comprises generating a quantity of shares having a value equal to a value of the canceled digital coin that is based on the real-time intrinsic value;

generating a hash value representing the smart contract using the private cryptographic key;

transmitting the hash value representing the smart contract to a privacy computing platform; and transmitting the public cryptographic key to the privacy computing platform configured to decrypt the hash value representing the smart contract.

18. The system of claim 17, wherein a value of the digital coin is a percentage of a net asset value (NAV) of the exchange-traded fund.

19. The system of claim 17, wherein the smart contract is configured to generate additional digital coins for each owner of an originally issued digital coin and a value of each of the additional digital coins is less than a value of the originally issued digital coin.

* * * * *